(12) United States Patent
Choi et al.

(10) Patent No.: US 10,908,806 B2
(45) Date of Patent: Feb. 2, 2021

(54) METHOD FOR PROCESSING CARD INFORMATION AND ELECTRONIC DEVICE THEREOF

(71) Applicant: Samsung Electronics Co., Ltd., Gyeonggi-do (KR)

(72) Inventors: Bong-Sik Choi, Gyeongsangbuk-do (KR); Jun Kyoung Shin, Gyeongsangbuk-do (KR); Choonghoon Kim, Gyeongsangbuk-do (KR); Sung-Jun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/483,782

(22) PCT Filed: Feb. 2, 2018

(86) PCT No.: PCT/KR2018/001427
§ 371 (c)(1),
(2) Date: Aug. 6, 2019

(87) PCT Pub. No.: WO2018/147597
PCT Pub. Date: Aug. 16, 2018

(65) Prior Publication Data
US 2019/0391720 A1   Dec. 26, 2019

(30) Foreign Application Priority Data
Feb. 8, 2017 (KR) .................. 10-2017-0017401

(51) Int. Cl.
*G06F 1/16* (2006.01)
*G06Q 20/34* (2012.01)
(Continued)

(52) U.S. Cl.
CPC ............ *G06F 3/0488* (2013.01); *G06F 1/163* (2013.01); *G06F 3/0416* (2013.01); *G06Q 20/34* (2013.01); *G06Q 20/38* (2013.01); *H04W 4/80* (2018.02)

(58) Field of Classification Search
CPC ......... G06K 19/00; G06Q 20/20; G06Q 20/40
(Continued)

(56) References Cited

U.S. PATENT DOCUMENTS 9,392,047 B1 * 7/2016 Santana ............... H04L 67/34
2016/0112386 A1   4/2016 Park et al.
(Continued)

FOREIGN PATENT DOCUMENTS

KR   10-2012-0133706 A   12/2012
KR   10-2015-0108592 A    9/2015
(Continued)

*Primary Examiner* — Edwyn Labaze
(74) *Attorney, Agent, or Firm* — Cha & Reiter, LLC.

(57) ABSTRACT

An electronic device comprises: a housing; a touchscreen display exposed through a first portion of the housing; at least one connecting member connected to a second portion of the housing; at least one near distance wireless communication circuit positioned in the housing; a hardware secure element configured to store security information; a processor electrically connected to the touchscreen display, the at least one near distance wireless communication circuit, and the hardware secure element and positioned in the housing; and a memory electrically connected to the processor and positioned in the housing. The memory stores a first operating system (OS) including a user interface for a payment application and further stores a first application programming interface (API) for permitting access to the hardware secure element. When instructions stored by the memory are executed, the instructions cause the processor to: wirelessly pair with an external electronic device by using the at least one near distance wireless communication circuit; receive (Continued)

meta data on a card from the external electronic device through the at least one near distance wireless communication circuit; receive data on a plurality of payment cards from the external electronic device through the at least one near distance wireless communication circuit; store the data in the hardware secure element without installing other application programs related to the data; display, on the touchscreen display, the user interface for listing the plurality of accessed payment cards by using the meta data through the first API; receive a user input for selecting one of the plurality of payment cards through the touchscreen display; and transmit data on the basis of the determined payment card by using the at least one near distance wireless communication circuit. The at least one connecting member has a shape that encompasses a user's wrist. Additional various embodiments are possible.

15 Claims, 22 Drawing Sheets

(51) Int. Cl.
*G06Q 20/38* (2012.01)
*G06F 3/0488* (2013.01)
*H04W 4/80* (2018.01)
*G06F 3/041* (2006.01)

(58) Field of Classification Search
USPC .............................. 235/380, 375, 487; 705/5
See application file for complete search history.

(56) References Cited

U.S. PATENT DOCUMENTS

| | | | | |
|---|---|---|---|---|
| 2016/0241557 | A1* | 8/2016 | Philippot | H04L 63/0876 |
| 2017/0337542 | A1* | 11/2017 | Kim | G06Q 20/10 |
| 2018/0225442 | A1* | 8/2018 | Ranadive | G06F 21/34 |

FOREIGN PATENT DOCUMENTS

| | | |
|---|---|---|
| KR | 10-1582266 B1 | 1/2016 |
| KR | 10-2016-0046179 A | 4/2016 |
| KR | 10-2016-0046559 A | 4/2016 |
| KR | 10-1620368 B1 | 5/2016 |
| KR | 10-2016-0105261 A | 9/2016 |
| KR | 10-2016-0140062 A | 12/2016 |

* cited by examiner

METHOD FOR PROCESSING CARD INFORMATION AND ELECTRONIC DEVICE THEREOF

CROSS REFERENCE TO RELATED APPLICATIONS

This application is a National Phase Entry of PCT International Application No. PCT/KR2018/001427, which was filed on Feb. 2, 2018, and claims a priority to Korean Patent Application No. 10-2017-0017401, which was filed on Feb. 8, 2017, the contents of which are incorporated herein by reference.

TECHNICAL FIELD

Various embodiments of the present disclosure relate to a method and an electronic device for processing card information.

BACKGROUND ART

As a portable electronic device such as a smart phone gradually exhibits high performance, various services are provided through the electronic device. Specifically, in addition to basic services such as telephone call and text message sending, service areas are expanding to more complex services such as game, messenger, text editing, image/video playback and editing.

For example, users who use an electronic payment service using the electronic device are increasing. The electronic payment service is a service which issues a card to the electronic device through communication between the electronic device and a server, and provides the use of the card issued to the electronic device. In some cases, a plurality of cards may be issued to one electronic device. In this case, the user may select one card of the plurality of the cards as the card to use for the payment through an interface provided from the electronic device.

DISCLOSURE OF INVENTION

Technical Problem

If a card is issued to a secure module of a wearable device via an electronic device as in the related art, since a card application is not installed on the wearable device, a default card may not be set at the wearable device and needs to be set through the electronic device.

Various embodiments of the present disclosure provide a method and an electronic device for determining a default card in a wearable device.

Various embodiments of the present disclosure provide a method and an electronic device for providing necessary information to configure an interface for selecting a default card in a wearable device.

Various embodiments of the present disclosure provide a method and an electronic device for synchronizing default card information in a wearable device.

Solution to Problem

According to an embodiment of the present disclosure for addressing the above-stated problems, an electronic device may include a housing, a touchscreen display exposed through a first portion of the housing, at least one connecting member coupled to a second portion of the housing, at least one near distance wireless communication circuit disposed in the housing, a hardware secure element configured to store security information, a processor electrically coupled with the touchscreen display, the at least one near distance wireless communication circuit, and the hardware secure element and disposed in the housing, and a memory electrically coupled with the processor and disposed in the housing. The memory may store a first operating system (OS) including a user interface for a payment application, and further store a first application programming interface (API) which permits access to the hardware secure element. The memory may store, if instructions are executed, the instructions which cause the processor to wirelessly pair with an external electronic device using the at least one near distance wireless communication circuit, receive meta data of a card from the external electronic device through the at least one near distance wireless communication circuit, receive data relating to a plurality of payment cards from the external electronic device through the at least one near distance wireless communication circuit, store the data in the hardware secure element without installing other application program relating to the data, display the user interface for listing the plurality of the payment cards accessed using the meta data through the first API on the touchscreen display, receive a user input which selects one of the plurality of the payment cards through the touchscreen display, and transmit data based on the selected payment card using the at least one near distance wireless communication circuit. The at least one connecting member may surround a user's wrist.

According to another embodiment of the present disclosure, an electronic device may include a housing, a touchscreen display exposed through a first portion of the housing, at least one connecting member coupled to a second portion of the housing, at least one near distance wireless communication circuit disposed in the housing, a hardware secure element configured to store security information, a processor electrically coupled with the touchscreen display, the at least one near distance wireless communication circuit, and the hardware secure element and disposed in the housing, and a memory electrically coupled with the processor and disposed in the housing. The memory may store a first OS including a user interface for a payment application, and further store a first API which permits access to the hardware secure element. The memory may store, if instructions are executed, the instructions which cause the processor to wirelessly pair with an external electronic device using the at least one near distance wireless communication circuit, receive first data generated from an operation of a second API for the external electronic device from the external electronic device through the at least one near distance wireless communication circuit, the first data indicating a location of the hardware secure element, receive second data relating to a plurality of payment cards from the external electronic device through the at least one near distance wireless communication circuit, store the second data in the hardware secure element without installing other application program relating to the second data, display the user interface for listing the plurality of the payment cards accessed using the first data through the first API on the touchscreen display, receive a user input which selects one of the plurality of the payment cards through the touchscreen display, and transmit data based on the selected payment card using the at least one near distance wireless communication circuit. The at least one connecting member may surround a user's wrist.

According to yet another embodiment of the present disclosure, an operating method of an electronic device may include wirelessly pairing with an external electronic device, receiving meta data of a card from the external electronic device, receiving data relating to a plurality of payment cards from the external electronic device, storing the data in a hardware secure element of the electronic device without installing other application program relating to the data, displaying a user interface for listing the plurality of the payment cards accessed using the meta data through a first API which permits access to the hardware secure element on a touchscreen display of the electronic device, receiving a user input which selects one of the plurality of the payment cards through the touchscreen display, and transmitting data based on the selected payment card.

According to still another embodiment of the present disclosure, an operating method of an electronic device may include wirelessly pairing with an external electronic device, receiving first data generated from an operation of a first API for the external electronic device from the external electronic device, the first data indicating a location of the hardware secure element of the electronic device, receiving second data relating to a plurality of payment cards from the external electronic device, storing the second data in the hardware secure element without installing other application program relating to the second data, displaying the user interface for listing the plurality of the payment cards accessed using the first data through the first API which permits access to the hardware secure element on a touchscreen display of the electronic device, receiving a user input which selects one of the plurality of the payment cards through the touchscreen display, and transmitting data based on the selected payment card.

Advantageous Effects of Invention

According to the present disclosure, without installing a card application on a wearable device, a default card for a card service may be determined at the wearable device.

According to the present disclosure, if a plurality of cards issued to a wearable device, a card service may be provided using a default card determined through the wearable card according to a situation.

BEST MODE FOR CARRYING OUT THE INVENTION

Figure 1:
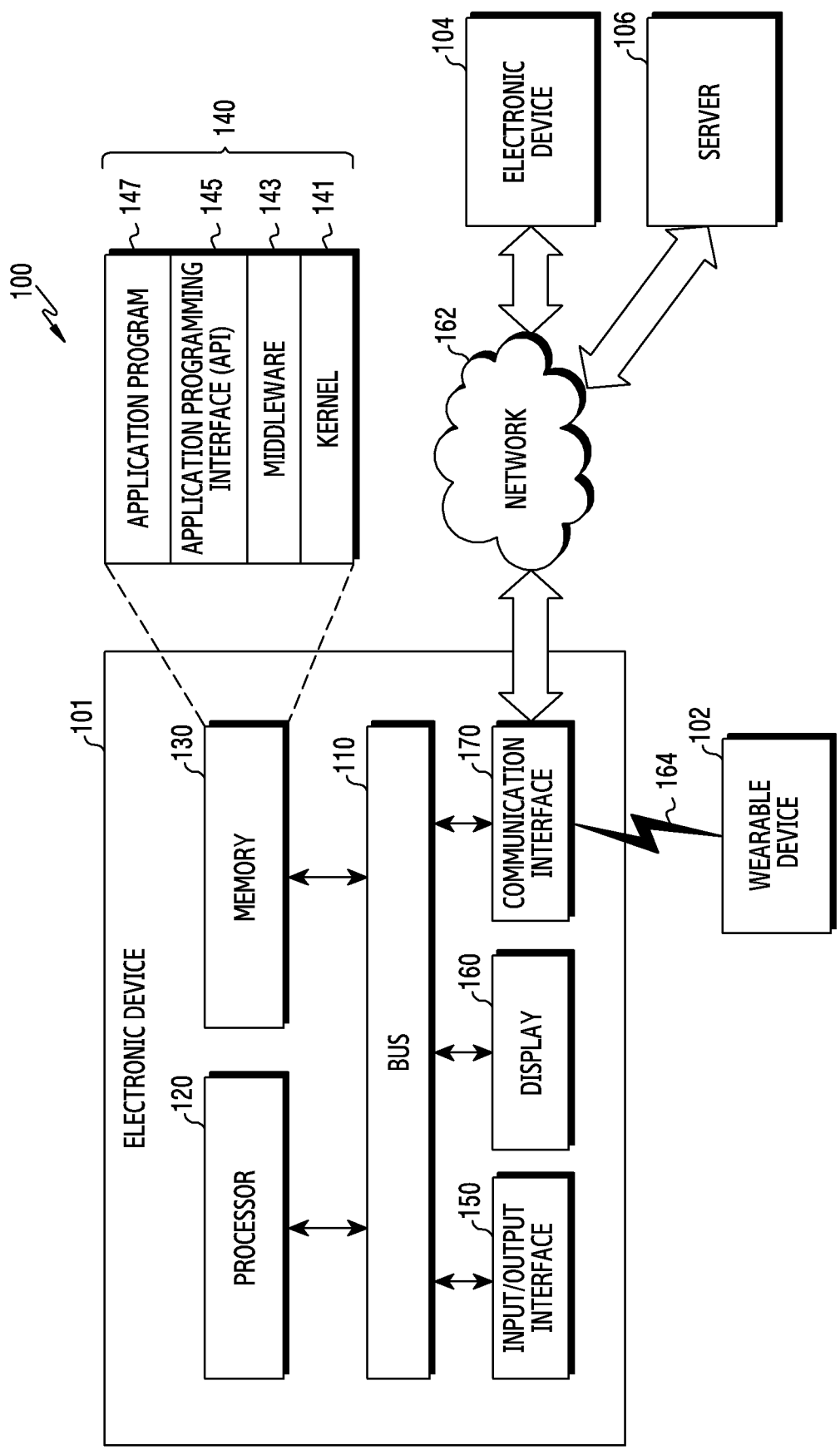
FIG. 1 illustrates an example of a network environment including an electronic device according to various embodiments of the present disclosure.

Hereinafter, various embodiments of the present disclosure are disclosed with reference to the attached drawings. It should be understood that embodiments and terms used herein are not intend to limit technique described in the present disclosure to a particular embodiment form but to cover various modifications, equivalents, and/or alternatives of the corresponding embodiments. In relation to descriptions of the drawings, like reference numerals may be used for similar components. The singular expression may include a plural expression unless the context clearly dictates otherwise. In the present disclosure, an expression such as "A or B" or "at least one of A and/or B" may include all possible combinations of items listed. Expressions such as "first" "second" "primarily" or "secondary" may represent various elements regardless of order or importance, are merely used to distinguish one element from other element, and do not limit corresponding elements. When it is described that an element (e.g., a first element) is "(operatively or communicatively) coupled" to or "connected" to another element (e.g., a second element), the element may be directly connected to the other element or may be connected through another element (e.g., a third element).

The expression "configured (or set) to" as used in the present disclosure may be used interchangeably with, for example, "suitable for", "having the capacity to", "adapted to", "made to", "capable of", or "designed to" according to the situation. The term "configured (or set) to" may not necessarily imply "specifically designed to" in hardware or in software. In some situation, an expression "apparatus configured to" may mean that the apparatus "can" operate together with another apparatus or other components. For example, a phrase "a processor configured (or set) to perform A, B, and C" may indicate a dedicated processor (e.g., an embedded processor) for performing a corresponding operation, or a generic-purpose processor (e.g., a central processing unit (CPU) or an application processor (AP)) which may perform corresponding operations by executing one or more software programs stored in a memory device.

An electronic device according to various embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG 3 (MP3) player, a medical equipment, a camera, or a wearable device. The wearable device may include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), or an implantable circuit. In some embodiments, the electronic device may include at least one of, for example, a television, a digital video disk (DVD) player, an audio, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of various medical devices (e.g., various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, or an ultrasonic wave device), a navigation device, a global navigation satellite system (GNSS), an event data recorder (EDR), a flight data recorder (FDR), a vehicle infotainment device, electronic equipment for ship (e.g., a navigation device for ship, a gyro compass, etc.), avionics, a security device, a head unit for a vehicle, an industrial or home robot, a drone, an automated teller machine (ATM) of a financial institution, a point of sales (POS) of a store, or an Internet of things (IoT) device (e.g., a light bulb, various sensors, a sprinkler device, a fire alarm, a thermostat, a street light, a toaster, sports equipment, a hot water tank, a heater, a boiler, etc.). According to an embodiment, the electronic device may include at least one of a portion of furniture, building/construction or vehicle, an electronic board, an electronic signature receiving device, a projector, or various measuring devices (e.g., water supply, electricity, gas, or electric wave measuring device). In various embodiments, the electronic device may be flexible or a combination of two or more of the foregoing various devices. An electronic device according to an embodiment of the present disclosure is not limited to the foregoing devices. In the present disclosure, the term user may refer to a person using an electronic device or a device using an electronic device (e.g., an artificial intelligence electronic device).

FIG. 1 illustrates a network environment including an electronic device according to various embodiments.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements. The bus 110 may include, for example, a circuit for connecting the elements 110-170 and transferring communication (e.g., control messages and/or data) between the elements. The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program. The API 145 is an interface through which the applications 147 control functions provided from the kernel 141 or the middleware 143, and may include, for example, at least one interface or function (e.g., instruction) for file control, window control, image processing, or text control. The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part. The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may include, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to an embodiment, the wireless communication may include, for example, at least one of Wi-Fi, Bluetooth, Bluetooth low energy (BLE), Zigbee, Near Field Communication (NFC), magnetic secure transmission, radio frequency, or body area network (BAN). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of wearable device 102 and electronic device 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the wearable device 102 or the electronic device 104 or the server 106). According to an embodiment, when the electronic device 101 has to perform some functions or services automatically or in response to a request, the electronic device 101 may make a request for performing at least some functions relating thereto to another device (e.g., the wearable device 102 or the electronic device 104 or the server 106) instead of performing the functions or services by itself or in addition. Another electronic device may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
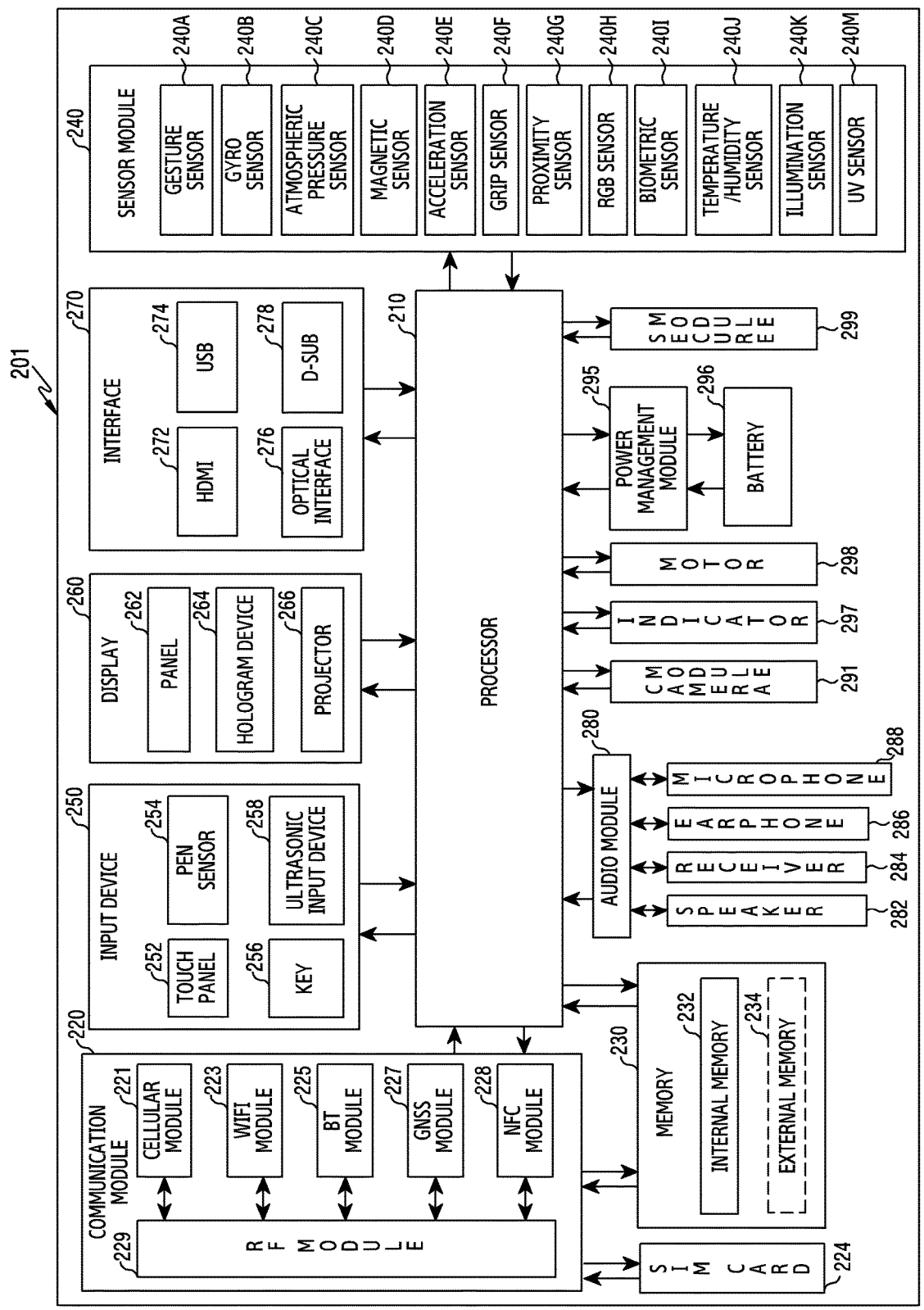
FIG. 2 illustrates an example of a block diagram of an electronic device according to various embodiments of the present disclosure.

FIG. 2 is a block diagram illustrating an example electronic device according to various example embodiments of the present disclosure.

The electronic device 201 may include, for example, all or a part of the electronic device 101 or wearable device 102 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298. The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

According to various embodiments, if the display is a thin film transistor (TFT) display which is driven with liquid crystal, the touch panel may include a touch display of an in-cell type which is also used as an electrode for driving the liquid crystal of the TFT.

According to various embodiments, the pen sensor 254 may include an electromagnetic resonance (EMR) sensor for detecting whether an electronic pen detachable from the electronic device 201 is inputted. According to one embodiment, the processor may detect an input position by receiving a feedback signal for a resonance frequency according to vibrations of a coil unit of the electronic pen, using an electromagnetic field generating from the EMR sensor. According to one embodiment, the processor may include a control circuit (driver IC) disposed in the EMR sensor.

The display 260 (e.g., the display 160) may include a panel 262, a hologram device 264, a projector 266, and/or a control circuit for controlling them. The panel 262 may be implemented be, for example, flexible, transparent, or wearable. The panel 262 may be configured as one or more modules with the touch panel 252. According to an embodiment, the panel 262 may include a pressure sensor (or a force sensor) for measuring the pressure of user's touch. The pressure sensor may be integrated with the touch panel 252 or may be implemented by one or more sensors separate from the touch panel 252. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO™. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device.

The secure module 299 may indicate a storage space for storing card information of a card issued. In some embodiments, the secure module 299 may indicate hardware for accessing the card information. The secure module 299 may be referred to as other name such as "secure element", "secure space, and "secure chip" according to its technical meaning. In some embodiments, the secure module 299 may be included in the memory 230. In other embodiments, the secure module 299 may be included in the subscriber identification module 224.

Figure 3:
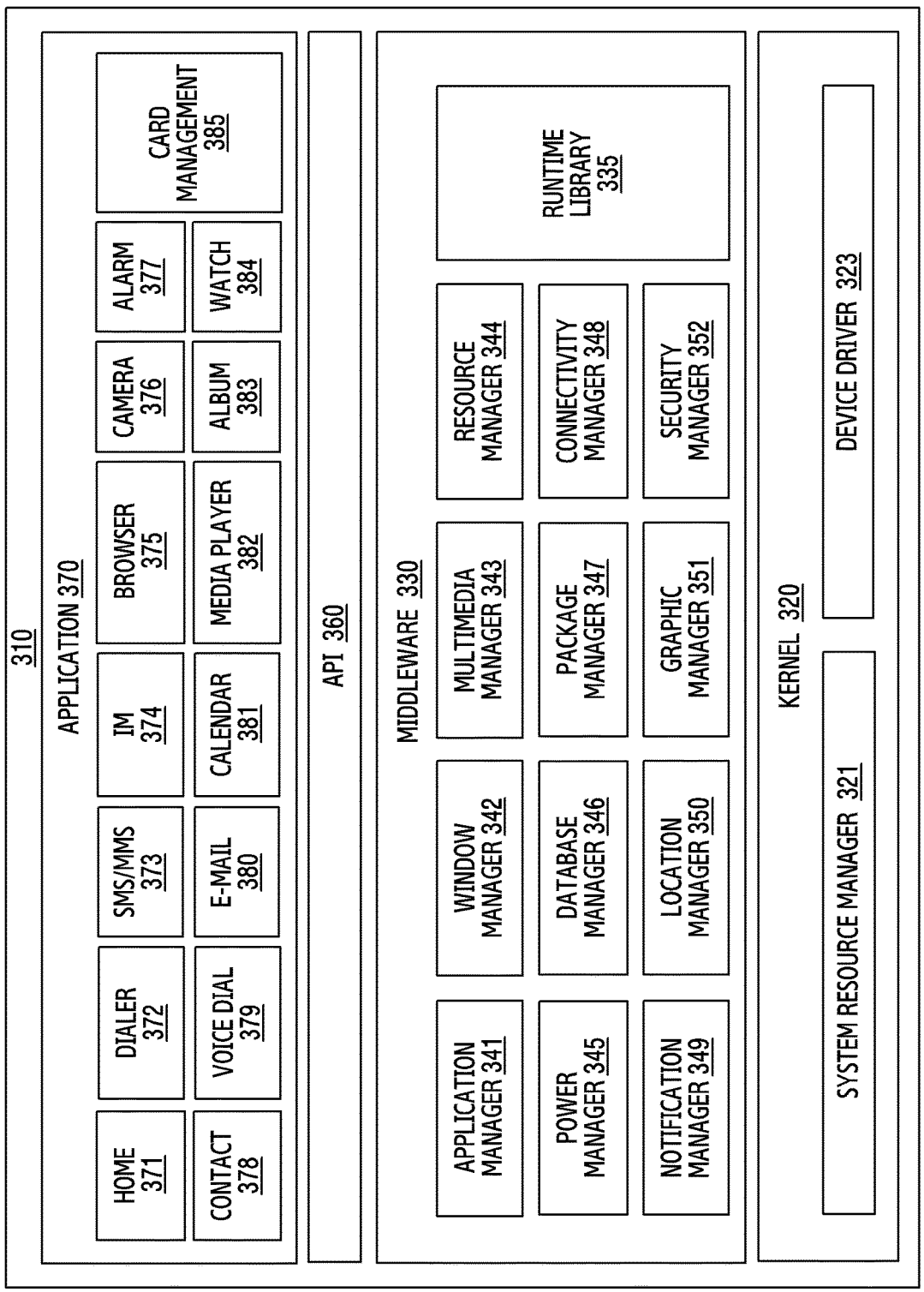
FIG. 3 illustrates an example of a block diagram of a program module according to various embodiments of the present disclosure.

FIG. 3 is a block diagram of a program module according to various embodiments. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

Referring to FIG. 3, the program module 310 may include a kernel 320 (for example, kernel 141), middleware 330 (for example, middleware 143), an API 360 (for example, API 145), and/or an application 370 (for example, application program 147). At least some of the program module 310 may be preloaded on the electronic device, or may be downloaded from an external electronic device (e.g., the electronic device 102 or 104, or the server 106).

The kernel 320 may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352. The middleware 330 may provide interoperation between the electronic device 101 and the wearable device 102 by using various managers included in the middleware 330.

The runtime library 335 may include a library module that a compiler uses in order to add a new function through a programming language while the applications 370 are being executed. The runtime library 335 may perform input/output management, memory management, the functionality for an arithmetic function, or the like. The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370. The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment, the middleware 330 may further include a telephony manager for managing a voice call function or a video call function of the electronic device or a middleware module that forms a combination of various functions of the above-described elements. According to an embodiment, the middleware 330 may provide a module specialized for each type of OS. Also, the middleware 330 may dynamically delete some of the existing elements, or may add new elements. The API 360 is, for example, a set of API programming functions, and may be provided with a different configuration according to an OS. For example, in the case of Android or iOS, one API set may be provided for each platform, in the case of Tizen, two or more API sets may be provided for each platform.

The applications 370 may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, and clock 384. According to various embodiments, the application 370 may include health care (for example, measure exercise quantity or blood sugar), or environment information (for example, atmospheric pressure, humidity, or temperature information). According to an embodiment, the applications 370 may include an application (hereinafter, referred to as an "information exchange application" for convenience of description) supporting information exchange between the electronic device and an external electronic device. The application associated with information exchange may include, for example, a notification relay application for forwarding specific information to an external electronic device, or a device management application for managing an external electronic device. For example, the notification relay application may include a function of delivering, to the external electronic device, notification information generated by other applications of the electronic device or receiving notification information from an external electronic device and providing the received notification information to a user. The device management application may install, delete, or update, for example, a function for the external electronic device communicating with the electronic device (for example, turning on/off the external electronic device itself (or some elements thereof) or adjusting brightness (or resolution) of a display), or applications executed in the external electronic device. According to an embodiment, the applications 370 may include applications (for example, a health care application of a mobile medical appliance or the like) designated according to attributes of the external electronic device. According to an embodiment, the application 370 may include an application received from the external electronic device. At least some of the program module 310 may be implemented (executed) in software, firmware, hardware (for example, processor 210), or a combination of two or more thereof, and at least some of the program module 310 may include a module, a program, a routine, a set of instructions, and/or a process for performing one or more functions. The card management 385 may indicate an application for issuing the card. In some embodiments, the card management 385 may indicate an application for transmitting meta data of the card. In other embodiments, the card management 385 may indicate an application for transmitting parameters of the meta data of the card through an API for the wearable device 102.

The term "module" used in the present disclosure includes a unit including hardware, software, or firmware, and, for example, may be interchangeably used with terms such as logic, logical block, component, or circuit. "module" may be an integral component or a minimum unit for performing one or more functions or its part. "module" may be mechanically or electrically implemented, and, for example, may include an application-specific integrated circuit (ASIC) chip, a field-programmable gate arrays (FPGAs), and a programmable logic device, which are known or will be developed, for conducting certain operations. At least part of a device (e.g., modules or functions thereof) or a method (e.g., operations) according to various embodiments may be implemented with an instruction stored in a computer readable storage medium (e.g., the memory 130) in the form of a program module. If the instruction is executed by a processor (e.g., the processor 120 of FIG. 1 or the processor 210 of FIG. 2), the processor may perform a function corresponding to the instruction. The computer readable recording medium may include a hard disk, a floppy disc, magnetic media (e.g., a magnetic tape), optical storage media (e.g., a compact disc-ROM (CD-ROM) or a DVD, magnetic-optic media (e.g., a floptical disc)), an internal memory, and so on. The instruction may include code created by a compiler or code executable by an interpreter. The module or program module according to various embodiments may include at least one or more of the aforementioned components, omit some of them, or further include other components. Operations performed by the module, the program, or another component according to various embodiments may be carried out sequentially, in parallel, repeatedly, or heuristically, or at least some operations may be executed in a different order or omitted, or other operations may be added.

Figure 4:
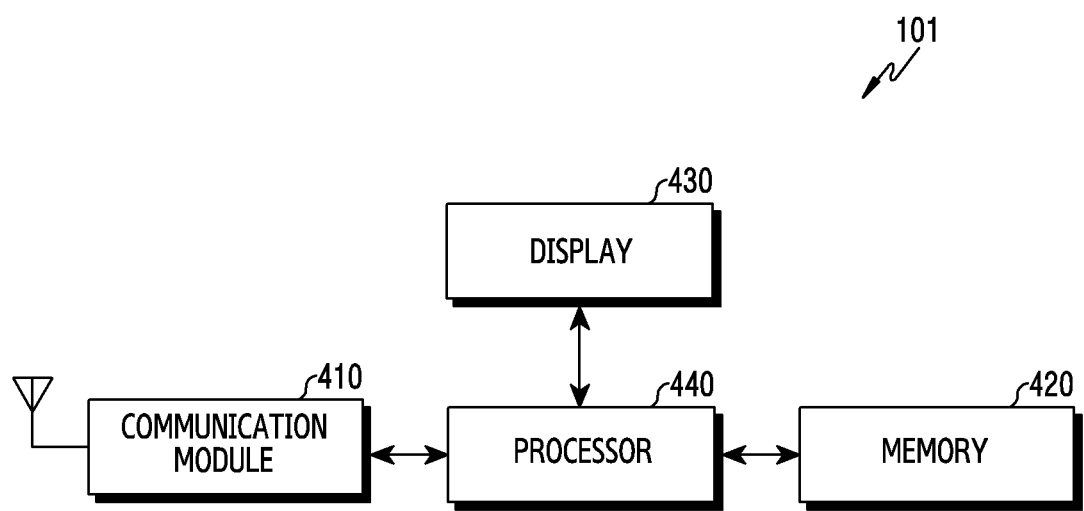
FIG. 4 illustrates an example of a functional configuration of an electronic device according to various embodiments of the present disclosure.

FIG. 4 illustrates an example of a functional configuration of an electronic device 101 according to various embodiments of the present disclosure.

Referring to FIG. 4, the electronic device 101 may include a communication module 410, a memory 420, a display 430, and a processor 440.

The communication module 410 (e.g., the communication interface 170 of FIG. 1 or the communication module 220 of FIG. 2) may receive a radio frequency (RF) signal. For doing so, the communication module 410 may include at least one antenna. The communication module 410 may down-convert a received signal to generate an intermediate frequency (IF) or baseband signal. The communication module 410 may include a receive processing circuit for generating a baseband signal processed by filtering, decoding, and/or digitizing the baseband or IF signal. The receive processing circuit may transmit the processed baseband signal to a speaker for voice data, or to the processor 440 (e.g., the processor 120 of FIG. 1 or the processor 210 of FIG. 2) for a further processing (e.g., web browsing data). Also, the communication module 410 may include at least one transceiver. The at least one transceiver may receive outgoing baseband data (e.g., web data, e-mail, interactive video game data) from the processor 440. A transmit processing circuit may encode, multiplex, and digitize the outgoing baseband data to generate the processed baseband or IF signal. The communication module 410 may up-convert the outgoing baseband or IF signal processed in the transmit processing circuit, to an RF signal to transmit over an antenna. In some embodiments, the communication module 410 may transmit a message including meta data of the card to the wearable device 102. In other embodiments, the communication module 410 may transmit a message including parameters for the meta data of the card through the API for the wearable device 102 to the wearable device 102.

The processor 440 may control the communication module 410, the memory 420, and the storage unit 430 which are functionally coupled with the processor 440. For example, the processor 440 may control reception of a forward channel signal and transmission of a reverse channel signal using the communication module 410. In some embodiments, the processor 440 includes at least one microprocessor or microcontroller. The processor 440 may execute other process or program resident in the device. The processor 440 may store or fetch data in or from the electronic device 101 as requested by an executed process. The processor 440 may be configured to execute an application in response to a received signal based on the OS. In some embodiments, the processor 440 may add information indicating the location of the secure module to an install file of the card application. In some embodiments, the processor 440 may execute the API for the wearable device (e.g., the wearable device 102 of FIG. 1).

The memory 420 (e.g., the memory 130 of FIG. 1 or the memory 230 of FIG. 2) may store a basic program for operating the device, an application program, and data such as setting information. The memory 420 may include a volatile memory, a nonvolatile memory, or a combination of a volatile memory and a nonvolatile memory. The memory 420 may provide the stored data at a request of the processor 440. In some embodiments, the memory 420 may store information of the issued card. In other embodiments, the memory 420 may store the card application.

The display 430 (e.g., the display 160 of FIG. 1 or the display 260 of FIG. 2) may be a liquid crystal screen, a light emitting diode display, or other screen for displaying text and/or image. The display 430 may display a screen corresponding to data received through the processor 440. The display 430 may display a card list of the electronic device 101 including a plurality of cards and a card list of the wearable device 102 including a plurality of cards.

While FIG. 4 illustrates that the device includes the communication module 410, the processor 440, the memory 420, and the display 430, which are exemplary, the device may further include other component and some of the processor 440, the memory 420, and the display 430 may be omitted.

Figure 5:
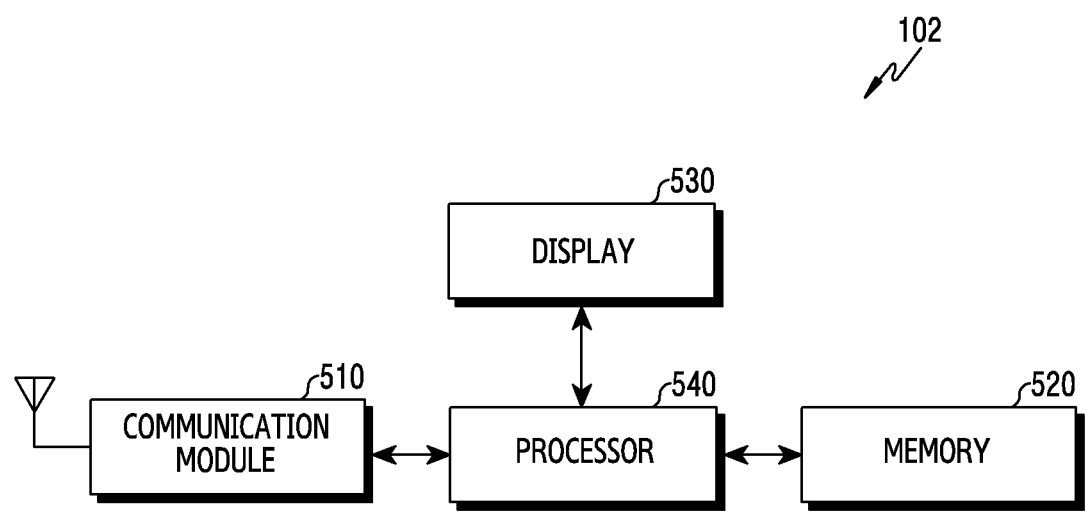
FIG. 5 illustrates an example of a functional configuration of a wearable device according to various embodiments of the present disclosure.

FIG. 5 illustrates an example of a functional configuration of a wearable device 102 according to various embodiments of the present disclosure.

According to one embodiment, the wearable device 102 may include, for example, whole or part of the electronic device 201 of FIG. 2.

Referring to FIG. 5, the wearable device 102 may include a communication module 510, a memory 520, a display 530, and a processor 540.

The communication module 510 (e.g., the communication module 220 of FIG. 2) may receive an RF signal. For doing so, the communication module 510 may include at least one antenna. The communication module 510 may down-convert a received signal to generate an IF or baseband signal. The communication module 510 may include a receive processing circuit for generating a baseband signal processed by filtering, decoding, and/or digitizing the baseband or IF signal. The receive processing circuit may transmit the processed baseband signal to a speaker for voice data, or to the processor 540 for a further processing (e.g., web browsing data). Also, the communication module 510 may include at least one transceiver. The at least one transceiver may receive outgoing baseband data (e.g., web data, e-mail, interactive video game data) from the processor 540. A transmit processing circuit may encode, multiplex, and digitize the outgoing baseband data to generate the processed baseband or IF signal. The communication module 510 may up-convert the outgoing baseband or IF signal processed in the transmit processing circuit, to an RF signal to transmit over the antenna. In some embodiments, the communication module 510 may receive a message including meta data of the card from the electronic device 101. In other embodiments, the communication module 510 may receive a message including parameters for the meta data of the card through the API for the wearable device 102 from the electronic device (e.g., the electronic device 101 of FIG. 1).

The processor 540 (e.g., the processor 210 of FIG. 2) may control the communication module 510, the memory 520, and the storage unit 530 which are functionally coupled with the processor 540. For example, the processor 540 may control reception of a forward channel signal and transmission of a reverse channel signal using the communication module 510. In some embodiments, the processor 540 includes at least one microprocessor or microcontroller. The processor 540 may execute other process or program resident in the device. The processor 540 may store or fetch data in or from the wearable device 102 as requested by an executed process. The processor 540 may be configured to execute an application in response to a received signal based on the OS. In some embodiments, the processor 540 may identify the card based on identifier meta data of the card and meta data of the type of the secure module.

The memory 520 (e.g., the memory 230 of FIG. 2) may store a basic program for operating the device, an application program, and data such as setting information. The memory 520 may include a volatile memory, a nonvolatile memory, or a combination of a volatile memory and a nonvolatile memory. The memory 520 may provide the stored data at a request of the processor 540. In some embodiments, the memory 520 may store information of the issued card. In other embodiments, the memory 520 may store the meta data of the card.

The display 530 (e.g., the display 260 of FIG. 2) may be a liquid crystal screen, a light emitting diode display, or other screen for displaying text and/or image. The display 530 may display a screen corresponding to data received through the processor 540. The display 530 may display a card list of a plurality of cards of the wearable device 102.

While FIG. 5 illustrates that the device includes the communication module 510, the memory 520, the display 530, and the processor 540, which are exemplary, the device may further include other component and some of the memory 520, the display 530, and the processor 540 may be omitted.

In some embodiments, the wearable device 102 may include a housing, a touchscreen display exposed through a first portion of the housing, at least one connecting member coupled to a second portion of the housing, at least one near distance wireless communication circuit disposed in the housing, a hardware secure element configured to store security information, a processor electrically coupled with the touchscreen display, the at least one near distance wireless communication circuit, and the hardware secure element and disposed in the housing, and a memory electrically coupled with the processor and disposed in the housing. The at least one connecting member may surround a user's wrist.

Figure 6:
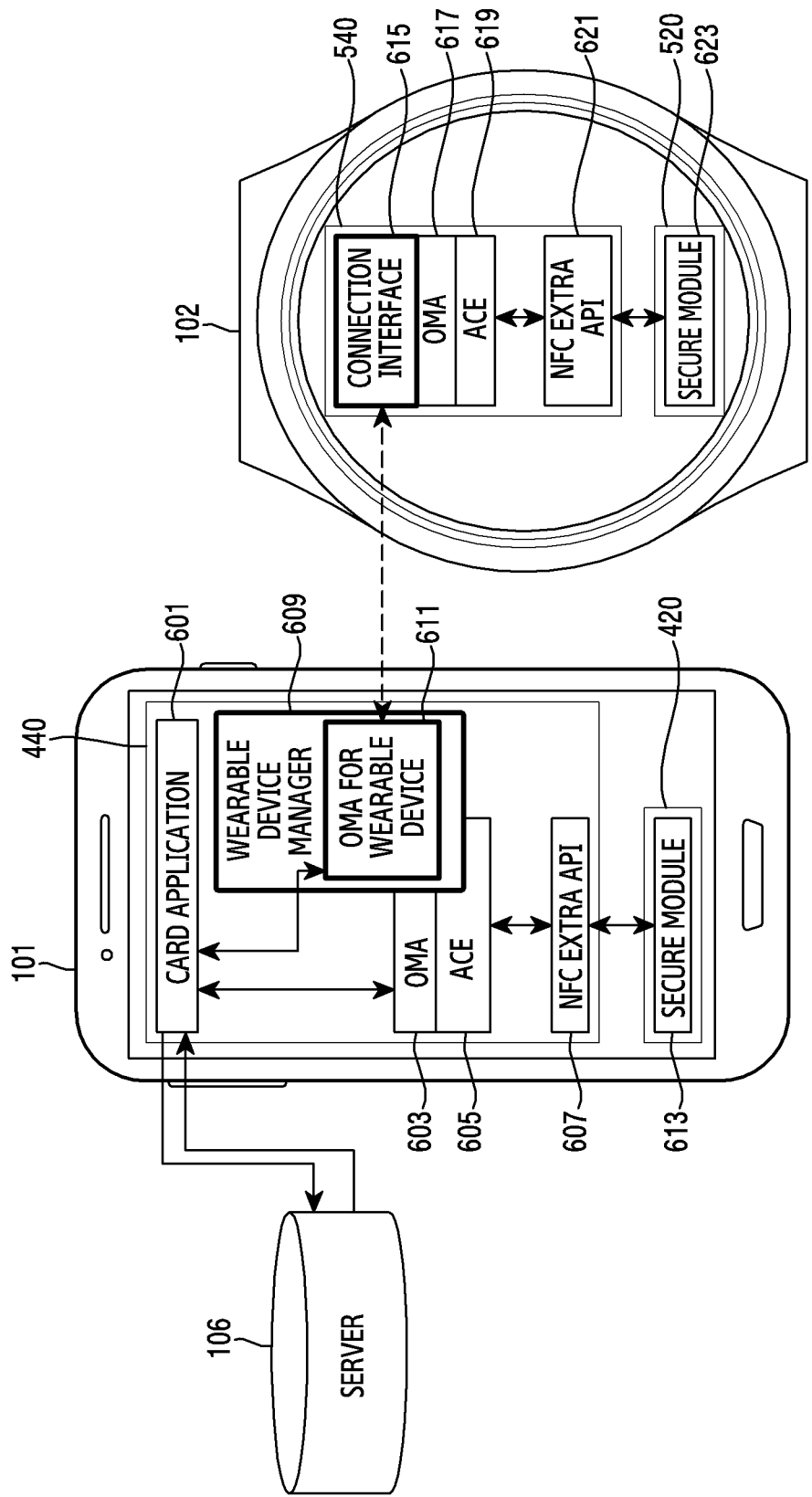
FIG. 6 illustrates an example of a functional configuration of an electronic device and a wearable device for issuing a card according to various embodiments of the present disclosure.

FIG. 6 illustrates an example of a functional configuration of an electronic device 101 and a wearable device 102 for issuing a card according to various embodiments of the present disclosure.

Referring to FIG. 6, the processor 440 of the electronic device 101 may include a card application 601, an open mobile API (OMA) 603, an access control enforcer (ACE) 605, an NFC extra API 607, a wearable device manager 609, and an OMA 611 for the wearable device. The card application 601 may store card information in a secure module 613 included in the memory 420 using at least one of the OMA 603, the ACE 605, and the NFC extra API 607. The card application 601 may indicate an application for providing an application or a card service to issue a card. The OMA 603 may indicate an interface for interoperability between the card application 601 and the card information stored in the secure module 613, by accessing the secure module 613. In addition, the OMA 603 may be used to store the card information in the secure module 613. The ACE 605 may perform a function allowing only a specific card application to access particular card information stored in the secure module 613 for the sake of security. The ACE 605 may be disposed on a lower layer of the OMA 603. If the secure module 613 is an embedded secure element (eSE), the NFC extra API 607 may indicate an interface used to access the eSE through the OMA 603 which controls the access to the secure module. The NFC extra API 607 may indicate an interface for interoperating (e.g., communicating) with the card information by accessing the eSE. According to the type of the secure module 613, the NFC extra API 607 may be omitted. The wearable device manager 609 may indicate an application for establishing a connection between the electronic device 101 and the wearable device 102. The wearable device manager 609 may provide the card information for the card issuing to the wearable device 102. The OMA 611 for the wearable device may indicate the OMA 603 modified to access the secure module 623 of the wearable device 102 in the electronic device 101.

The processor 540 of the wearable device 102 may include a connection interface 615, an OMA 617, an ACE 619, and an NFC extra API 621. Herein, the connection interface 615 may indicate an interface for performing the communication between the OMA 611 for the wearable device of the electronic device 101 and the OMA 617 of the wearable device 102. The OMA 617 may indicate an interface for interoperability between the OMA 611 for the wearable device and the card information stored in the secure module 623, by accessing the secure module 623. In addition, the OMA 617 may be used to store the card information in the secure module 623. The ACE 619 may perform a function allowing only a specific application card to access particular card information stored in the secure module 623 for the sake of security. The ACE 619 may be disposed on a lower layer of the OMA 617. If the secure module 623 is the eSE, the NFC extra API 621 may indicate an interface used to access the eSE through the OMA 617 which controls the access to the secure module. The NFC extra API 621 may indicate an interface for interoperating (e.g., communicating) with the card information by accessing the eSE. According to the type of the secure module 623, the NFC extra API 621 may be omitted.

An electronic device according to various embodiments of the present disclosure may include a housing, a touchscreen display exposed through a first portion of the housing, at least one connecting member coupled to a second portion of the housing, the at least one connecting member surrounding a wrist of a user, at least one near distance wireless communication circuit disposed in the housing, a hardware secure element configured to store security information, a processor electrically coupled with the touchscreen display, the at least one near distance wireless communication circuit, and the hardware secure element and disposed in the housing, and a memory electrically coupled with the processor and disposed in the housing. The memory may store a first OS including a user interface for a payment application, and further store a first API which permits access to the hardware secure element. The memory may store, if instructions are executed, the instructions which cause the processor to wirelessly pair with an external electronic device using the at least one near distance wireless communication circuit, receive meta data of a card from the external electronic device through the at least one near distance wireless communication circuit, receive data relating to a plurality of payment cards from the external electronic device through the at least one near distance wireless communication circuit, store the data in the hardware secure element without installing other application program relating to the data, display the user interface for listing the plurality of the payment cards accessed using the meta data through the first API on the touchscreen display, receive a user input which selects one of the plurality of the payment cards through the touchscreen display, and transmit data based on the selected payment card using the at least one near distance wireless communication circuit.

The external electronic device according to various embodiments of the present invention may include a second OS which is different from the first OS. The second OS according to various embodiments of the present disclosure may include android OS. The at least one near distance wireless communication circuit according to various embodiments of the present disclosure may be configured to support at least one of WiFi, Bluetooth, or NFC protocol. The first API according to various embodiments of the present disclosure may include an OMA.

An electronic device according to various embodiments of the present disclosure may include a housing, a touchscreen display exposed through a first portion of the housing, at least one connecting member coupled to a second portion of the housing, the at least one connecting member surrounding a wrist of a user, at least one near distance wireless communication circuit disposed in the housing, a hardware secure element configured to store security information, a processor electrically coupled with the touchscreen display, the at least one near distance wireless communication circuit, and the hardware secure element and disposed in the housing, and a memory electrically coupled with the processor and disposed in the housing. The memory may store a first OS including a user interface for a payment application, and further stores a first API which permits access to the hardware secure element. The memory may store, if instructions are executed, the instructions which cause the processor to wirelessly pair with an external electronic device using the at least one near distance wireless communication circuit, receive first data generated from an operation of a second API for the external electronic device from the external electronic device through the at least one near distance wireless communication circuit, the first data indicating a location of the hardware secure element, receive second data relating to a plurality of payment cards from the external electronic device through the at least one near distance wireless communication circuit, store the second data in the hardware secure element without installing other application program relating to the second data, display the user interface for listing the plurality of the payment cards accessed using the first data through the first API on the touchscreen display, receive a user input which selects one of the plurality of the payment cards through the touchscreen display, and transmit data based on the selected payment card using the at least one near distance wireless communication circuit.

The external electronic device according to various embodiments of the present disclosure may include a second OS which is different from the first OS. The second OS according to various embodiments of the present disclosure may include android OS. The at least one near distance wireless communication circuit according to various embodiments of the present disclosure may be configured to support at least one of WiFi, Bluetooth, or NFC protocol. The first API according to various embodiments of the present disclosure may include an OMA.

Figure 7:
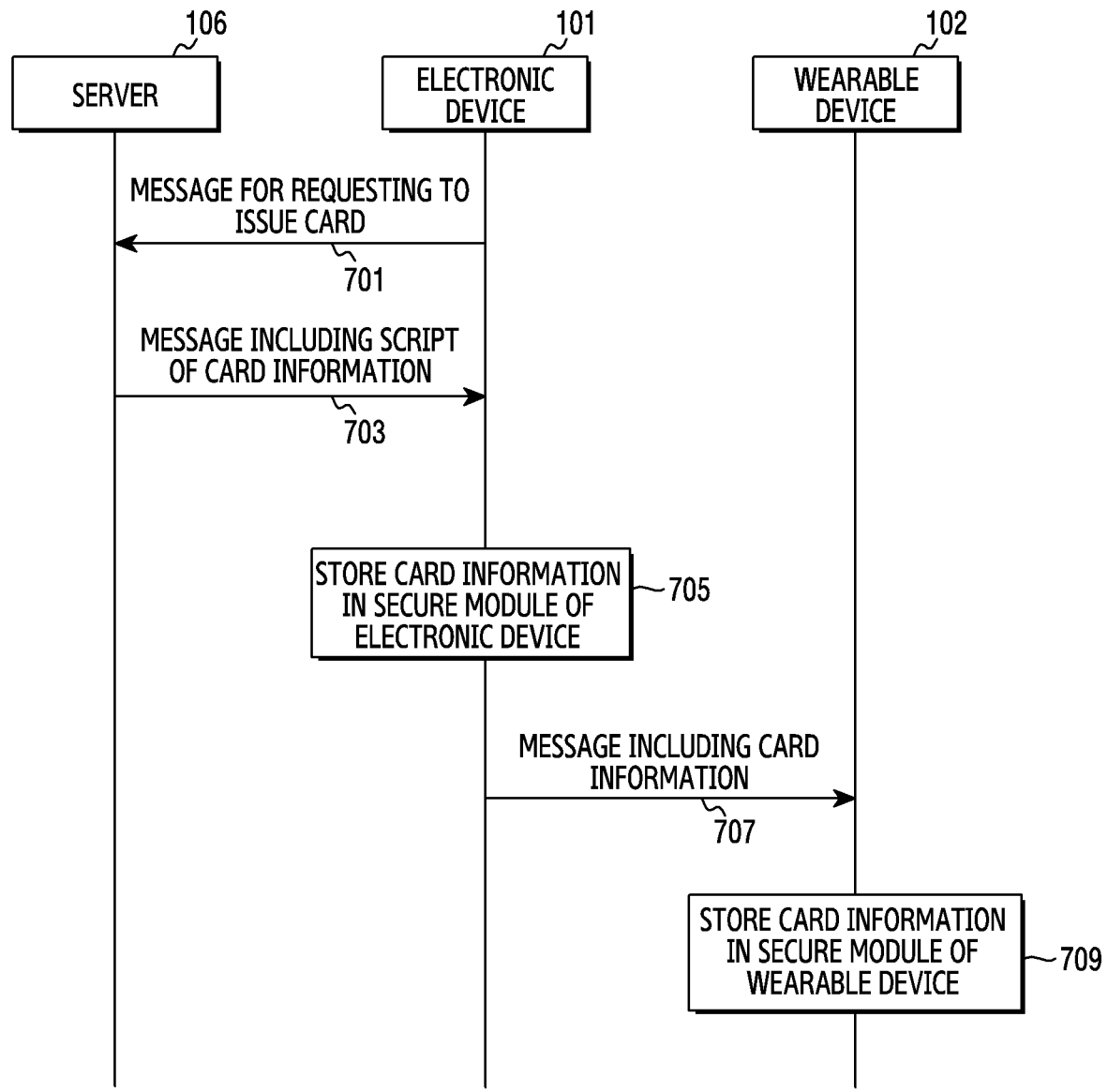
FIG. 7 illustrates signal exchanges for issuing a card according to various embodiments of the present disclosure.

FIG. 7 illustrates signal exchanges for issuing a card according to various embodiments of the present disclosure. FIG. 7 illustrates the signal exchanges between an electronic device 101, a wearable device 102, and a server 106.

Referring to FIG. 7, in operation 701, a processor (e.g., processor 440) of the electronic device 101 may control to transmit a message requesting to issue a card to the server 106 through a communication module (e.g., the communication module 410). For example, the processor of the electronic device 101 may control to transmit the message requesting to issue the card to the server 106 through the communication module. Herein, the card information may indicate a program installed on a secure module (e.g., the secure module 299) for issuing the card. The card information may indicate a card applet. The card information may be referred to as other name such as "card issuing information" and "card issuing program" according to its technical meaning.

In operation 703, the server 106 may transmit a message including script of the card information to the electronic device 101. Herein, the script of the card information may indicate an instruction for issuing the card. The script for the card information may be referred to as other name such as "card install instruction" and "card issuing instruction" according to its technical meaning.

In operation 705, according to one embodiment, the electronic device 101 may store the card information in the secure module (e.g., the secure module 613 of FIG. 6) of the electronic device 101. According to one embodiment, the electronic device 101 may generate the card information using the received script, and then store the card information in the secure module 613 of the electronic device 101. For example, the electronic device 101 may store the generated card information in the secure module 613 included in the memory 420 by using at least one of the OMA 603, the ACE 605, and the NFC extra API 607. According to one embodiment, operation 705 may be omitted.

In operation 707, the processor of the electronic device 101 may control to transmit a message including the card information to the wearable device 102 through the communication module. For example, if determining to use a card to the wearable device 402, the processor of the electronic device 101 may control to transmit a message including the card information to the wearable device 102 using the wearable device manager 609 including the OMA 611 for the wearable device. In some embodiments, the processor of the electronic device 101 may control to transmit meta data of the card together with the card information to the wearable device 102 through the communication module. In other embodiments, the electronic device 101 may display a UI indicating whether or not to issue the card to the wearable device 102. As receiving a user input for issuing the card to the wearable device 102, the processor of the electronic device 101 may control to transmit a message including the card information to the wearable device 102 through the communication module.

In operation 709, the wearable device 102 may store the card information in the secure module 623 of the wearable device 102. For example, the wearable device 102 may store the card information received from the electronic device 101 through the connection interface 715 in the secure module 623 included in the memory 520 using at least one of the OMA 617, the ACE 619, and the NFC extra API 621.

Figure 8:
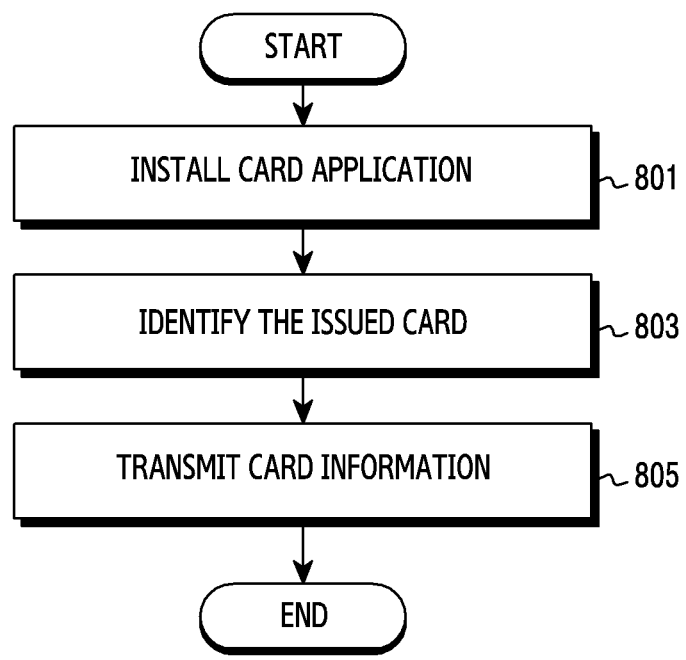
FIG. 8 illustrates a flowchart of an electronic device for transmitting card information to a wearable device according to various embodiments of the present disclosure.

FIG. 8 illustrates a flowchart of an electronic device 101 for transmitting card information to a wearable device 102 according to various embodiments of the present disclosure. FIG. 8 illustrates an operating method of the electronic device 101.

Referring to FIG. 8, in operation 801, the electronic device 101 may install a card application on the electronic device 101. For example, a processor (e.g., the processor 440) of the electronic device 101 may install a file for installing the card application received via the communication module 410 on a memory (e.g., the memory 420). Herein, the card application may be developed by a card service provider. The install file for installing the card application may be an android package (APK) file. In some embodiments, the file for installing the card application may be configured with an XML file. For example, the install file for the card application may include AndroidManifest.xml of <Table 1> and apduservice.xml of <Table 2>. However, the name of the XML file is not limited, and may be referred to as various names. The install file for installing the card application may include meta data of the card. As the electronic device 101 installs the card application, the meta data of the card may be transferred to a framework of the operating system of the electronic device 101.

TABLE 1

```
<service android:name= ".MyoffHostApduservice"
android:exported= "true"
    android:permission=
    "android.permission.BIND_NFC_SERVICE">
  <intent-filter>
    <action android:name=
    "android.nfc.cardemulation.action.OFF_HOST_APDU_SERVICE"/>
  </intent-filter>
  <meta-data android:name=
  "android.nfc.cardemulation.off_host_apdu_service"
      android:resource= "@xml/apduservice"/>
  <meta-data android:name="android.nfc.cardemulation.se_extensions"
      android:resource="@xml/cardemulation extension"/>
<service>
```

AndroidManifest.xml of <Table 1> may include required information of the card application to be obtained before the processor of the electronic device 101 executes code of the card application. Herein, the required information may include information relating to the interoperation between the card application and the card information. For example, the instruction "OFF_HOST_APDU_SERVICE" of <Table 1> may indicate that the card application operates in association with the card information stored in the secure module. For another example, the meta-data of "android.nfc.cardemulation.off_host_apdu_service" of <Table 1> may indicate that information of the card information identifier relating to the card application is included in apduservice.xml. As yet another example, "android.nfc.cardemulation.se_extensions" of <Table 1> may indicate that information of the type of the secure module relating to the card application is included in cardemulation_extension.xml.

TABLE 2

```
<offhost-apdu-service.xmlns:android=
http://schemas.android.com/apk/res/android
    android:description= "@string/servicedesc">
  <aid-group android:description= "@string/subscription"
    android:category= "other">
```

TABLE 2-continued

```
    <aid-filter android:name= "F0010203040506"/>
    <aid-filter android:name= "F0394148148100"/>
  <aid-group>
</offhost-apdu-service>
```

Herein, the code of the third row through the sixth row of <Table 2> may indicate the information of the card information identifier relating to the card application.

In operation 803, the electronic device 101 may identify the card issued to the electronic device 101. For example, the processor of the electronic device 101 may identify the card issued using the card information stored in the memory (or the secure module) of the electronic device 101.

In operation 805, the electronic device 101 may transmit the card information to the wearable device 102. For example, the processor of the electronic device 101 may control to transmit the card information to the wearable device 102 through a communication module (e.g., the communication module 410). In some embodiments, the card information may be meta data of the identifier of the card information and meta data of the type of the secure module. In this case, the processor of the electronic device 101 may control to transmit the card information to the wearable device 102 based on the information indicating the location of the secure module via the communication module. In some other embodiments, the card information may be a parameter corresponding to the identifier of the card information and a parameter corresponding to the type of the secure module. In this case, the processor of the electronic device 101 may control to transmit the card information to the wearable device 102 via the API for the wearable device 102 through the communication module. As the card information is transmitted to the wearable device 102, a processor (e.g., the processor 540) of the wearable device 102 may configure a UI for selecting a default card.

Figure 9:
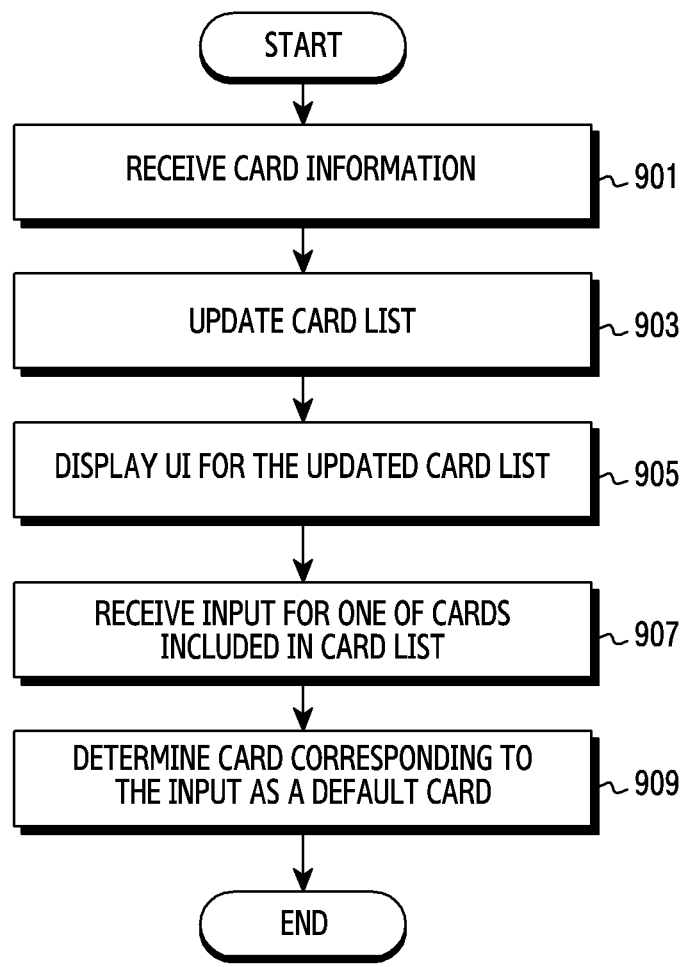
FIG. 9 illustrates a flowchart of a wearable device for determining a default card in the wearable device according to various embodiments of the present disclosure.

FIG. 9 illustrates a flowchart of a wearable device 102 for determining a default card in the wearable device 102 according to various embodiments of the present disclosure. FIG. 9 illustrates an operating method of the wearable device 102.

Referring to FIG. 9, in operation 901, a processor (e.g., the processor 440) of the wearable device 102 may receive card information from the electronic device 101 via a communication module (e.g., the communication module 510). In some embodiments, the card information may be meta data regarding the identifier of the card information and meta data regarding the type of the secure module. In some other embodiments, the card information may be a parameter corresponding to the identifier of the card information and a parameter corresponding to the type of the secure module.

The electronic device 101 may update a card list of the electronic device 101 and a card list of the wearable device 102 by transferring the card information included in the card application to a framework of the OS. By contrast, the wearable device 102 may install a card on the secure module (e.g., the secure module 723) of the wearable device 102 through the electronic device 101 while the card application is not installed. Thus, using the card information received from the electronic device 101, the processor (e.g., the processor 540) of the wearable device 102 may identify that the card information is stored in the secure module of the wearable device 102, and update the card list of the wearable device 102.

In operation 903, according to one embodiment, the processor of the wearable device 102 may update the card list of the wearable device 102 based on the card information received from the electronic device 101. Herein, the card list of the wearable device 102 may include a plurality of cards issued to the wearable device 102. For example, the processor of the wearable device 102 may add a card corresponding to the card information received from the electronic device 101 into the card list of the wearable device 102 including the plurality of the cards.

In operation 905, a display (e.g., the display 530) of the wearable device 102 may display a UI of the updated card list of the wearable device 102. That is, the display of the wearable device 102 may display the UI for the updated card list of the wearable device 102 without installing the card application on a memory (e.g., the memory 520) of the wearable device 102. Herein, the UI for the updated card list of the wearable device 102 may be used for the user to determine the card corresponding to the card information received from the electronic device 101 as a default card in the wearable device 102. The default card may indicate a card to use by default among a plurality of cards, or a card to use by default in a separate payment procedure. The default card may be referred to as other name such as "default card" and "basic card" according to its technical meaning.

In operation 907, the processor of the wearable device 102 may receive an input for one of the plurality of the cards included in the card list of the wearable device 102. In some embodiments, the input may indicate that the user physically touches a touch display of the wearable device 102 or presses or turns a physical button of the wearable device 102.

In operation 909, the processor of the wearable device 102 may determine the card corresponding to the input as the default card. According to one embodiment, although the card application is not installed on the memory of the wearable device 102, the wearable device 102 may determine the default card.

As described with reference to FIG. 8 and FIG. 9, according to one embodiment, the card information (e.g. meta data of the identifier of the card applet, meta data of the type of the secure module, etc.) may be transferred through the communication module (e.g., the communication module 410) of the electronic device 101. The processor of the wearable device 102 may control to configure and display on the display a UI for selecting the default card, based on the received card information. Transferring the card information as described above may be implemented according to various embodiments. For example, the card information may be implemented by modifying the meta data of the card or adding a function of the card application. In the following, each embodiment shall be elucidated.

Figure 10:
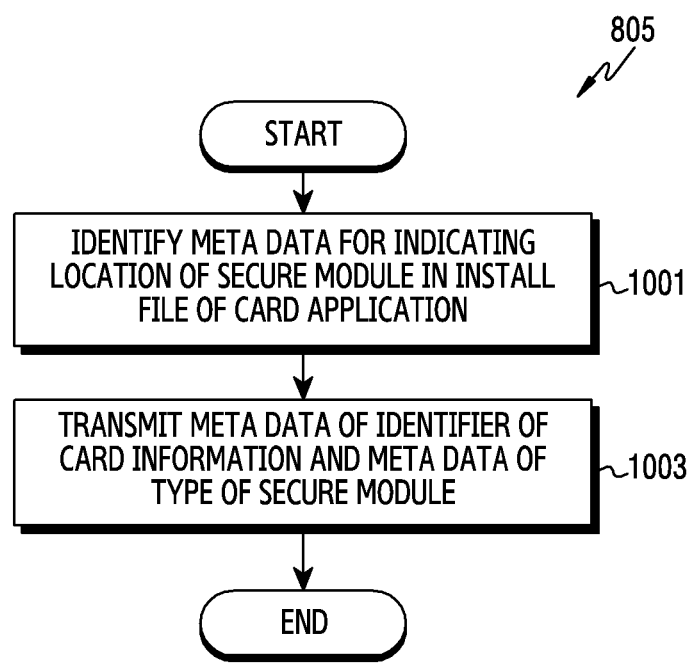
FIG. 10 illustrates a flowchart of an electronic device for transferring meta data to a wearable device based on the meta data according to various embodiments of the present disclosure.

FIG. 10 illustrates a flowchart of an electronic device 101 for transferring meta data to a wearable device 102 based on the meta data according to various embodiments of the present disclosure. FIG. 10 illustrates an operating method of the electronic device 101. FIG. 10 illustrates the detailed flowchart of operations 805 of FIG. 8.

Referring to FIG. 10, in operation 1001, a processor (e.g., the processor 440) of the electronic device 101 may identify meta data for indicating the location of the secure module in the install file of the card application. Herein, the location of the secure module may indicate the wearable device 102 including the secure module. In some embodiments, the install file for the card application may further include cardemulation_extension.xml of <Table 3>.

TABLE 3

```
<extentions xmlns:android= http://www.samsung.com android:description=
"@string/servicedesc">
  <se-ext-group>
    <se-id name= "eSE" />
    <se-location name= "Wearable" />
  </se-ext-group>
</extensions>
```

Here, the code of the third row of <Table 3> may indicate the type of the secure module associated with the card application. For example, the type of the secure module may be the eSE. In addition, the code of the fourth row of <Table 3> may indicate the location of the secure module. The processor of the electronic device 101 may identify information (e.g., "Wearable") in a location field of the secure module through the install file for the application. Herein, "Wearable" may indicate the wearable device 102.

In operation 1003, the processor of the electronic device 101 may control to transmit the meta data for the identifier of the card information and the meta data for the type of the secure module to the wearable device 102 through the communication module (e.g., the communication module 410). For example, the identifier of the card information may be an application identifier (AID). In addition, the type of the secure module may be the eSE or a universal integrated circuit card (UICC). The meta data for the identifier of the card information and the meta data for the type of the secure module may be transmitted to the wearable device 102 based on the meta data indicating the location of the secure module.

Figure 11:
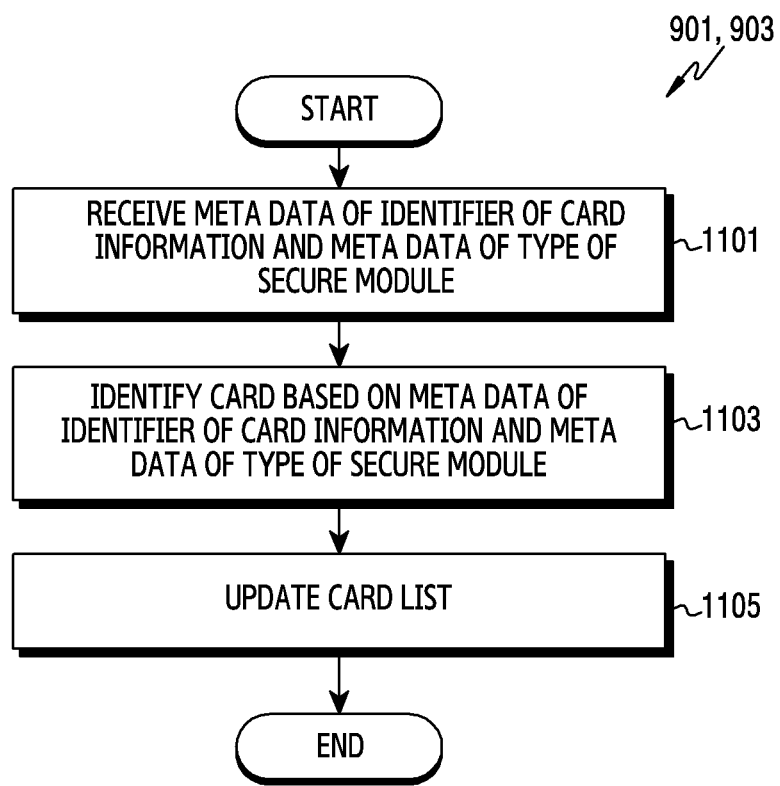
FIG. 11 illustrates a flowchart of a wearable device for managing a card list of the wearable device based on meta data according to various embodiments of the present disclosure.

FIG. 11 illustrates a flowchart of a wearable device 102 for managing a card list of the wearable device 102 based on meta data according to various embodiments of the present disclosure. FIG. 11 illustrates the flowchart of the wearable device 102. FIG. 11 illustrates the detailed flowchart of operations 901 and 903 of FIG. 9.

Referring to FIG. 11, in operation 1101, the wearable device 102 may receive meta data for the identifier of the card information and meta data for the type of the secure module from the electronic device 101 through a communication module (e.g., the communication module 510). The meta data for the identifier of the card information and the meta data for the type of the secure module may be transferred to the framework of the OS of the wearable device 102.

In operation 1103, a processor (e.g., the processor 540) of the wearable device 102 may identify a card based on the meta data for the identifier of the card information and the meta data for the type of the secure module. For example, the processor of the wearable device 102 may identify card information stored in the secure module using the meta data for the identifier of the card information and the meta data for the type of the secure module, and thus identify the card corresponding to the card information.

In operation 1105, the processor of the wearable device 102 may update the card list of the wearable device 102. For example, the processor of the wearable device 102 may add the card corresponding to the card information into the card list of the wearable device 102. The card list of the wearable device 102 may include a plurality of cards issued to the wearable device 102.

Figure 12:
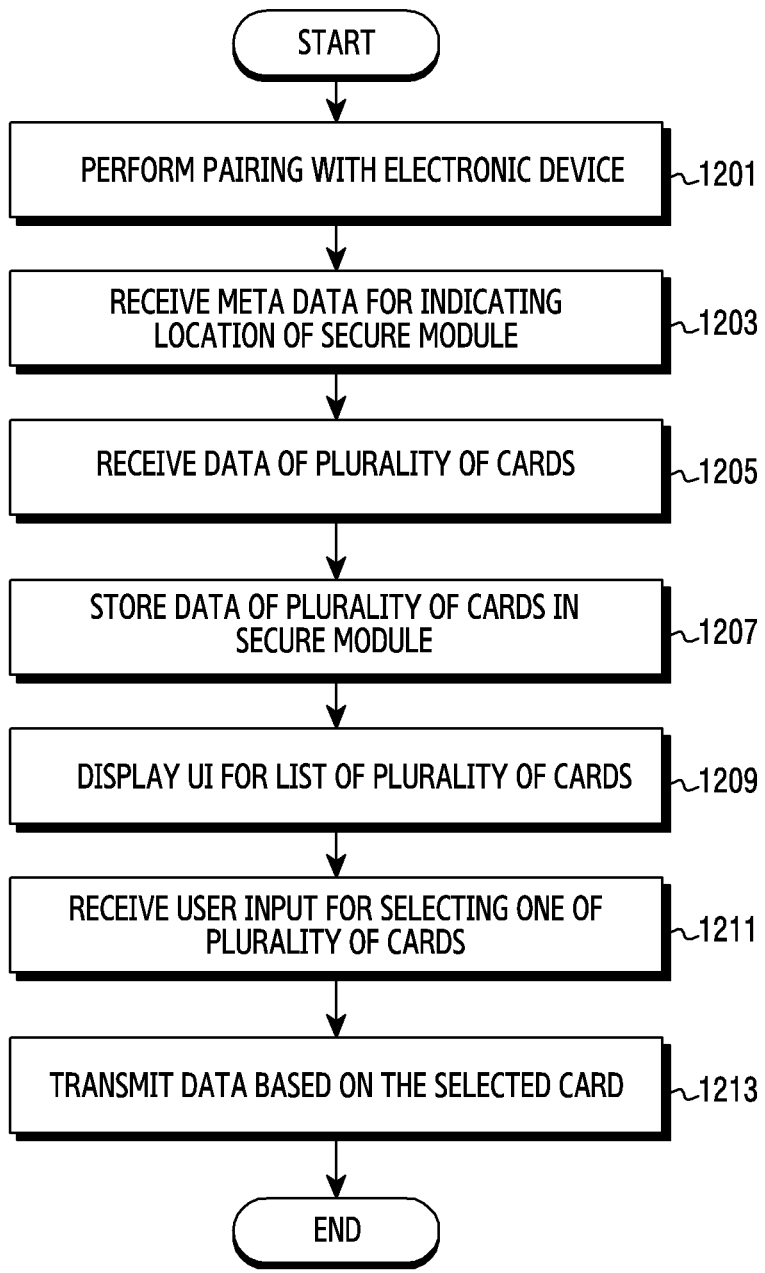
FIG. 12 illustrates another flowchart of a wearable device for determining a default card in the wearable device based on meta data according to various embodiments of the present disclosure.

FIG. 12 illustrates another flowchart of a wearable device 102 for determining a default card in the wearable device 102 according to various embodiments of the present disclosure. FIG. 12 illustrates an operating method of the wearable device 102.

Referring to FIG. 12, in operation 1201, a processor (e.g., the processor 540) of the wearable device 102 may control to perform pairing with the electronic device 101 through a communication module (e.g., the communication module 510). The processor of the wearable device 102 may communicate with the electronic device 102 using a wireless or wired communication through the communication module. For example, the communication module of the wearable device 102 may be configured to support at least one of WiFi, Bluetooth, or NFC protocol.

In operation 1203, the processor of the wearable device 102 may control to receive meta data of the card from the electronic device 101 through the communication module. In some embodiments, the processor of the wearable device 102 may control to receive an XML file including the meta data of the card from the electronic device 101 through the communication module. Herein, the XML file may include information regarding the type of the secure module and the identifier of the card information. In other embodiments, the information regarding the type of the secure module and the identifier of the card information may be transferred to the framework of the OS of the wearable device 102. Also, the XML file may include manifest.xml file. In other embodiments, the OS of the wearable device 102 may be different from the OS of the electronic device 101. For example, the OS of the wearable device 102 may be Android OS.

In operation 1205, the processor of the wearable device 102 may control to receive data regarding a plurality of cards through the communication module. The data regarding the plurality of the cards may indicate data for issuing the plurality of the cards to the wearable device 102. In addition, the data regarding the plurality of the cards may indicate card information of the plurality of the cards.

In operation 1207, a memory (e.g., the memory 520) of the wearable device 102 may store data regarding the plurality of the cards in the secure module. In some embodiments, the memory of the wearable device 102 may store an API which permits access to the secure module. For example, the API for permitting the access to the secure module may be the OMA.

In operation 1209, a display of the wearable device 102 (e.g., the display 530) may display a UI for a list of the plurality of the cards. The list of the plurality of the cards may include the card corresponding to the identifier of the card information and the type of the secure module.

In operation 1211, the processor of the wearable device 102 may receive a user input for selecting one of the plurality of the cards through the communication module. Receiving the user input may indicate that the user determines a default card or a card to use among the plurality of the cards.

In operation 1213, the processor of the wearable device 102 may control to transmit data based on the selected card through the communication module. The data may indicate data regarding the card service relating to the selected card. For example, the data may indicate information of the card payment.

Figure 13:
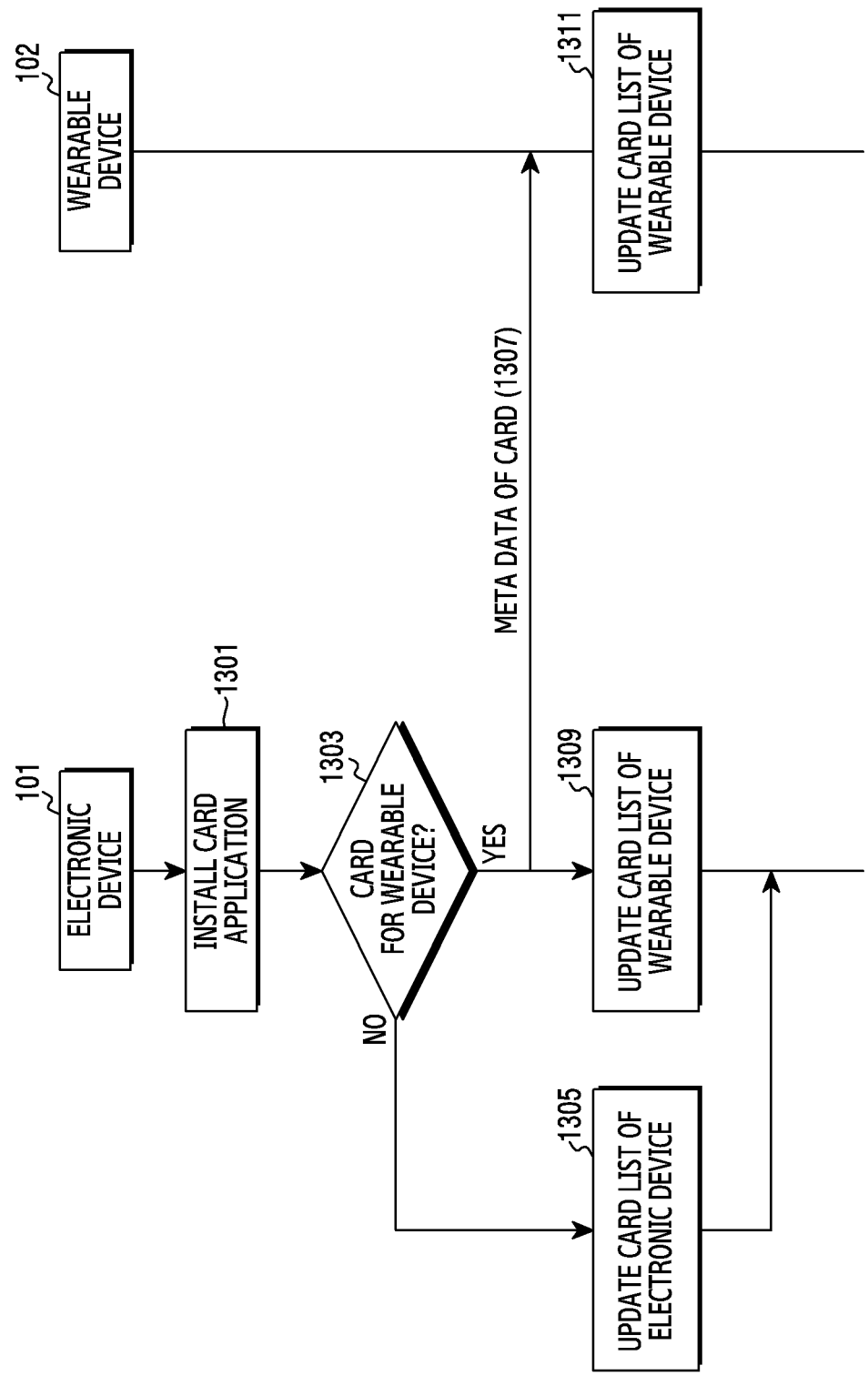
FIG. 13 illustrates signal exchanges for managing a card list of an electronic device or a card list of a wearable device based on meta data according to various embodiments of the present disclosure.

FIG. 13 illustrates signal exchanges between an electronic device 101 and a wearable device 102 for managing a card list of the electronic device 101 or a card list of the wearable device 102 based on meta data according to various embodiments of the present disclosure.

Referring to FIG. 13, in operation 1301, a processor (e.g., the processor 410) of the electronic device 101 may install a card application on a memory (e.g., the memory 420) of the electronic device 101. Herein, the card application may be developed by the card service provider. A file for installing the card application may include meta data of the card.

In operation 1303, the processor of the electronic device 101 may determine whether the issued card is for the wearable device 102. According to one embodiment, the processor of the electronic device 101 may determine whether the issued card is for the electronic device 101 or the wearable device 102, by parsing the install file (e.g., XML file) in installing the card application. For example, if the information indicating the location of the secure module included in the meta data of the card application indicates the wearable device 102, the processor of the electronic device 101 may determine that the issued card is for the wearable device 102. As another example, if the meta data of the card application does not include the information indicating the location of the secure module or the information indicating the location of the secure module indicates the electronic device 101, the processor of the electronic device 101 may determine that the issued card is for the electronic device 101.

If the issued card is not for the wearable device 102, in operation 1305, the processor of the electronic device 101 may update the card list of the electronic device 101. For example, the processor of the electronic device 101 may include the card issued to the electronic device 101 into the card list of the electronic device 101.

By contrast, if the issued card is for the wearable device 102, in operation 1307, the processor of the electronic device 101 may control to transmit the meta data of the card to the wearable device 102 through the communication module. Herein, the meta data of the card may include meta data of the identifier of the card information of the issued card and meta data of the type of the secure module.

In operation 1309, the processor of the electronic device 101 may update the card list of the wearable device 102. According to one embodiment, the processor of the electronic device 101 may manage the card list of the wearable device 102 separately from the card list of the electronic device 101. For example, the processor of the electronic device 101 may manage or update the list of a card newly issued to the wearable device 102 by using the wearable device manager 353. According to one embodiment, the processor of the electronic device 101 may transfer the meta data of the identifier of the card information and the meta data of the type of the secure module to the wearable device manager 353, and thus add the issued card into the card list of the wearable device 102. In some embodiments, operation 1307 and operation 1309 may be performed in the reverse order, and at the same time. In other words, while FIG. 13 illustrates the case where the operation 1307 is performed and then operation 1309 is performed, which is only an example for explanations, operation 1307 and operation 1309 may be performed regardless of order or simultaneously.

In operation 1311, a processor (e.g., the processor 540) of the wearable device 102 may update the card list of the wearable device 102. For example, the processor of the wearable device 102 may add the card issued to the wearable device 102 into the card list of the wearable device 102. According to one embodiment, the card list of the wearable device 102 managed at the electronic device 101 and the card list of the wearable device 102 managed at the wearable device 102 may be synchronized.

Figure 14:
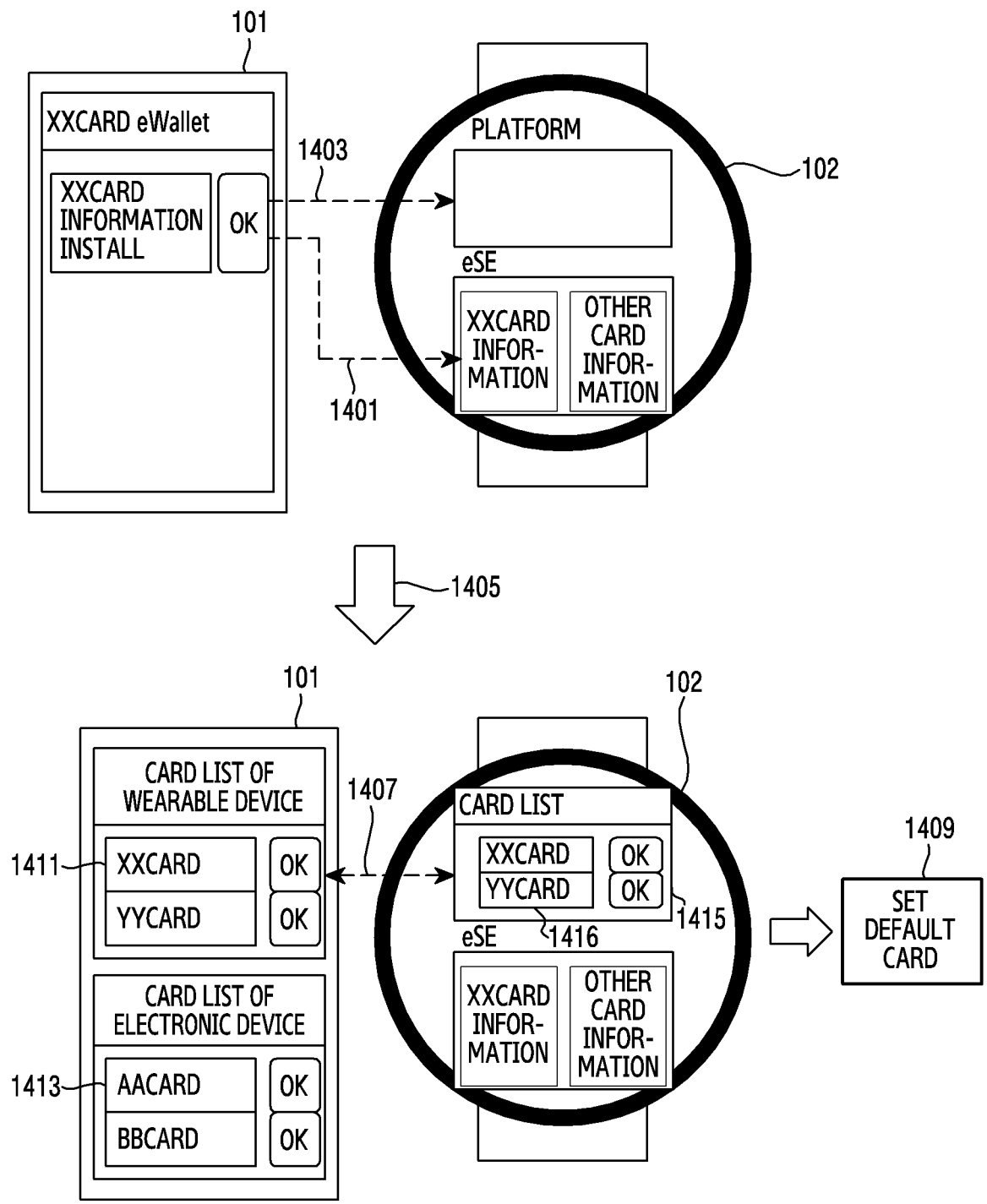
FIG. 14 illustrates an example of determining a default card in a wearable device according to various embodiments of the present disclosure.

FIG. 14 illustrates an example of determining a default card in a wearable device 102 according to various embodiments of the present disclosure.

Referring to FIG. 14, in operation 1401, a processor (e.g., the processor 440) of the electronic device 101 may control to transmit a message including card information to the wearable device 102 through a communication module (e.g., the communication module 410) of the electronic device 101. That is, the processor of the electronic device 101 may issue a card to the wearable device 102. According to one embodiment, if determining to issue the card to the wearable device 102, the processor of the electronic device 101 may control to transmit the message including the card information to the wearable device 102 using the OMA for the wearable device 102. For example, the OMA for the wearable device 102 may be an international standard organization (ISO) 7816 interface. That is, the OMA for the wearable device 102 may indicate an interface for storing the card information in the secure module and communicating with the card information.

In operation 1403, the processor of the electronic device 101 may control to transmit the card information through the API for the wearable device 102 through the communication module. Herein, the card information may be a parameter of the identifier of the card information and a parameter of the type of the secure module. The parameter of the identifier of the card information and the parameter of the type of the secure module may be generated as the API for the wearable device 102 is executed. The API for the wearable device 102 may be included in the card application by the card service provider.

In operation 1405, a processor (e.g., the processor 540) of the wearable device 102 may update a card list 1415 of the wearable device 102. For example, the processor of the wearable device 102 may add a card corresponding to parameter of the identifier of the card information and the parameter of the type of the secure module into the card list 1415 of the wearable device 102.

In operation 1407, the processor of the electronic device 101 may display a UI for the card list 1413 of the electronic device 101 and a UI for a card list 1411 of the wearable device 102 through a display (e.g., the display 430) of the electronic device 101, and update the card list 1411 of the wearable device 102. As the processor of the electronic device 101 updates the card list 1411 of the wearable device 102, the card list 1411 of the wearable device 102 updated at the electronic device 101 and the card list 1415 of the wearable device 102 updated at the wearable device 102 may be synchronized. That is, the card list 1411 of the wearable device 102 updated at the electronic device 101 and the card list 1415 of the wearable device 102 updated at the wearable device 102 may be set identically. For example, cards included in the card list 1411 of the wearable device 102 updated at the electronic device 101 and cards included in the card list 1415 of the wearable device 102 updated at the wearable device 102 may be set identically to an XX card and a YY card. In this case, the cards (e.g., the XX card, the YY cared) included the card list 1411 of the wearable device 102 updated at the electronic device 101 may differ from the cards (e.g., an AA card, a BB card) included in the card list 1413 of the electronic device 101 updated at the electronic device 101. That is, the card list 1411 of the wearable device 102 updated at the electronic device 101 may be managed separately from the card list 1413 of the electronic device 101 updated at the electronic device 101.

In operation 1409, the processor of the wearable device 102 may set a default card of the wearable device 102 based on a user input. The user may determine one of the plurality of the cards included in the card list 1415 of the wearable device 102 managed at the wearable device 102 as the default card.

According to one embodiment, if the default card of the wearable device 102 managed at the wearable device 102 is set while a communication connection is disconnected between the wearable device 102 and the electronic device 101, if the communication between the wearable device 102 and the electronic device 101 is connected again, the processor of the wearable device 102 may control to transmit information of the default card of the wearable device 102 managed at the wearable device 102 to the electronic device 101 through a communication module (e.g., the communication module 510). The processor of the electronic device 101 may set the same card as the default card of the wearable device 102 managed at the wearable device 102 as the default card of the wearable device 102 managed at the electronic device 101 based on the default card information of the wearable device 102 managed at the wearable device 102.

In some embodiments, the processor of the electronic device 101 may set the default card of the wearable device 102 managed at the electronic device 101 based on a user input. For example, the user may determine one of the plurality of the card included in the card list 1411 of the wearable device 102 managed at the electronic device 101 as the default card. According to one embodiment, if the default card of the wearable device 102 managed at the electronic device 101 is set while the communication connection is disconnected between the wearable device 102 and the electronic device 101, if the communication between the wearable device 102 and the electronic device 101 is connected again, the processor of the electronic device 101 may control to transmit information of the default card of the wearable device 102 managed at the electronic device 101 to the wearable device 102 through the communication module. The processor of the wearable device 102 may set the same card as the default card of the wearable device 102 managed at the electronic device 101 as the default card of the wearable device 102 managed at the wearable device 102 based on the default card information of the wearable device 102 managed at the electronic device 101.

Figure 15:
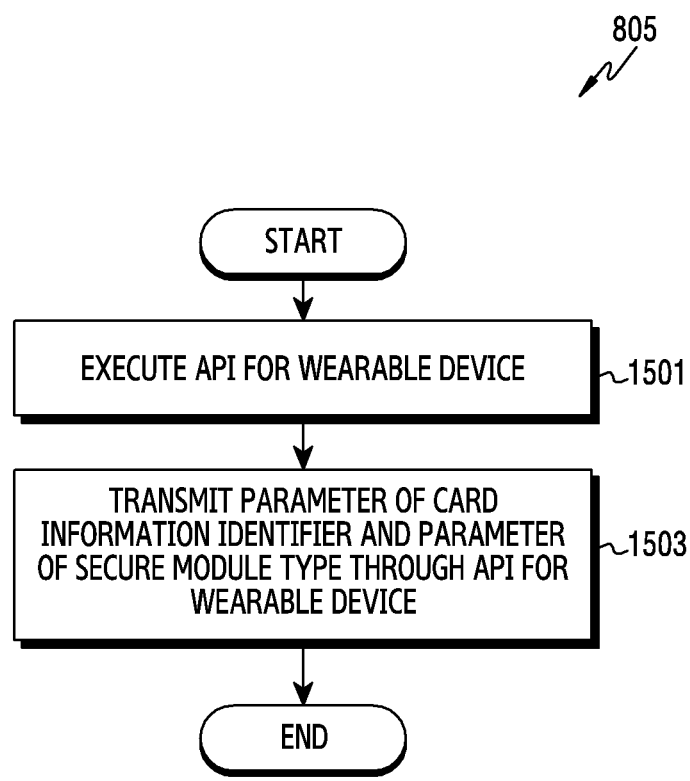
FIG. 15 illustrates a flowchart of an electronic device for transferring parameters regarding meta data of a card to a wearable device based on an application programming interface (API) for the wearable device according to various embodiments of the present disclosure.

FIG. 15 illustrates a flowchart of an electronic device for transferring parameters of meta data relating to a card to a wearable device based on an API for the wearable device according to various embodiments of the present disclosure. FIG. 15 illustrates an operating method of the electronic device 101. FIG. 15 illustrates the detailed flowchart of operation 805 of FIG. 8. FIG. 15 depicts the embodiment for transferring card information according to card application function addition.

Referring to FIG. 15, in operation 1501, a processor (e.g., the processor 440) of the electronic device 101 may execute the API for the wearable device 102. Herein, the API for the wearable device 102 may be included in the card application by the card service provider. The API for the wearable device 102 may indicate a function for transmitting the parameters of the meta data relating to the card. According to one embodiment, the processor of the electronic device 101 may call the API for the wearable device 102, and apply the function for transmitting the parameters of the meta data relating to the card. For example, the function for transmitting the parameters of the meta data relating to the card may be addWearableCardService. However, the name of the function is limited, and may be referred to as various names.

In operation 1503, the processor of the electronic device 101 may transmit the parameters of the meta data relating to the card to the wearable device 102 through the API for the wearable device 102. For example, the parameters of the meta data relating to the card may indicate the parameter of the identifier of the card information and the parameter of the type of the secure module. The parameter of the identifier of the card information and the parameter of the type of the secure module may be generated as the API for the wearable device 102 is executed. For example, the parameter name of the identifier of the card information may be aidGroup, and the parameter name of the type of the secure module may be seType. However, the names of the parameters are not limited, and may be referred to as various names.

Figure 16:
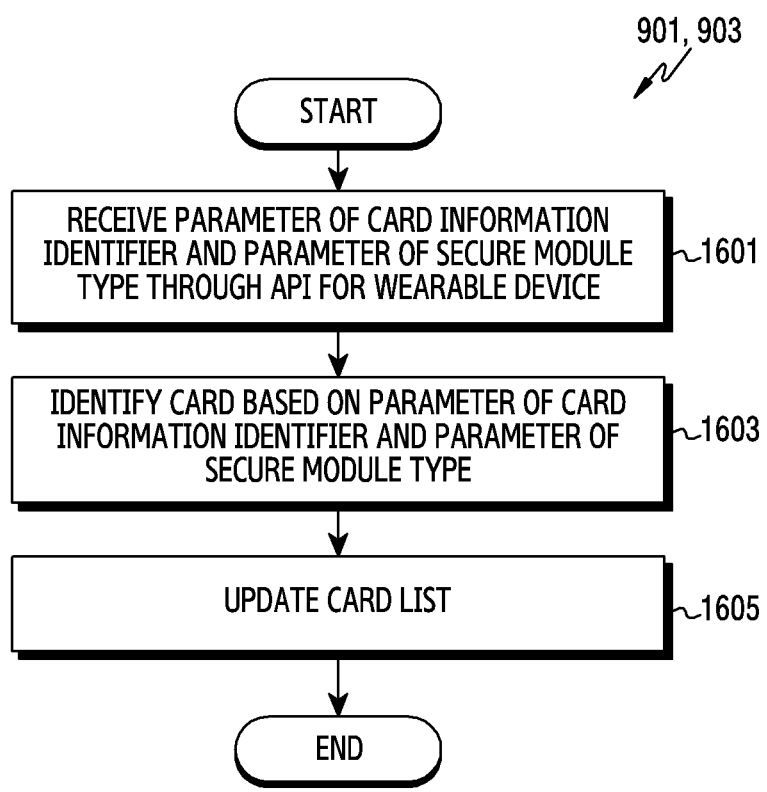
FIG. 16 illustrates a flowchart of a wearable device for managing a card list of the wearable device based on an API for the wearable device according to various embodiments of the present disclosure.

FIG. 16 illustrates a flowchart of a wearable device 102 for managing a card list of the wearable device 203 based on an API for the wearable device 102 according to various embodiments of the present disclosure. FIG. 16 illustrates an operating method of the wearable device 102. FIG. 16 depicts the detailed flowchart of operations 901 and 903 of FIG. 9.

According to one embodiment, a processor (e.g., the processor 540) of the wearable device 102 may determine a default card based on the API for the wearable device 102.

Referring to FIG. 16, in operation 1601, the processor of the wearable device 102 may receive the parameter of the identifier of the card information and the parameter of the type of the secure module from the electronic device 101 through the API for the wearable device 102.

In operation 1603, the processor of the wearable device 102 may identify a card based on the parameter of the identifier of the card information and the parameter of the type of the secure module. For example, the processor of the wearable device 102 may identify that card information is stored in the secure module of the wearable device 102 through the parameter of the identifier of the card information and the parameter of the type of the secure module.

In operation 1605, the processor of the wearable device 102 may update a card list of the wearable device 102. For example, the processor of the wearable device 102 may add the card corresponding to the card information into the card list of the wearable device 102. The card list of the wearable device 102 and may include a plurality of cards issued to the wearable device 102.

Figure 17:
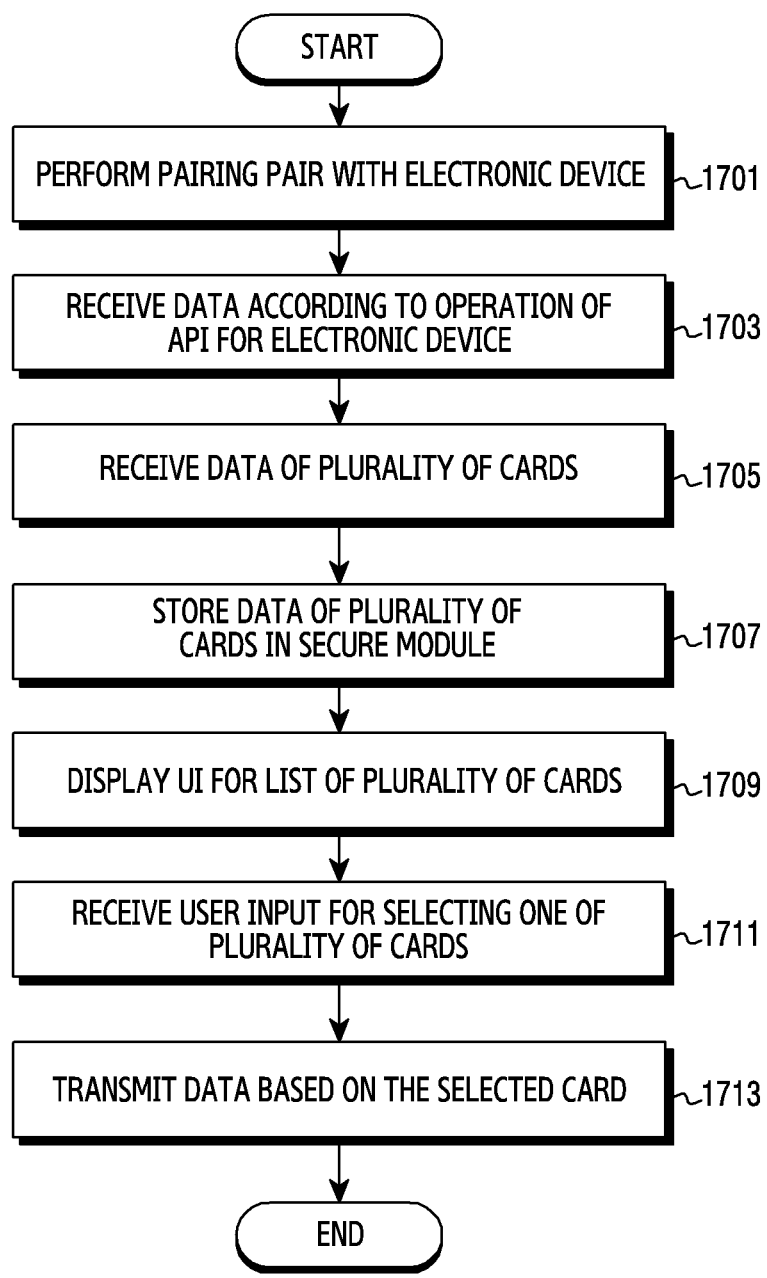
FIG. 17 illustrates another flowchart of a wearable device for managing a card list of the wearable device based on an API for the wearable device according to various embodiments of the present disclosure.

FIG. 17 illustrates another flowchart of a wearable device 102 for determining a default card in the wearable device 102 based on an API for the wearable device 102 according to various embodiments of the present disclosure. FIG. 17 illustrates an operating method of the wearable device 102.

According to one embodiment, a processor (e.g., the processor 540) of the wearable device 102 may determine a default card based on the API for the wearable device 102.

Referring to FIG. 17, in operation 1701, the wearable device 102 may perform pairing with the electronic device 101. The wearable device 102 may communicate with the electronic device 102 using the wireless or wired communication. For example, the communication module 510 of the wearable device 102 may be configured to support at least one of WiFi, Bluetooth, or NFC protocol.

In operation 1703, the wearable device 102 may receive data according to the operation of the API for the electronic device 101. For example, the processor of the wearable device 102 may receive the data according to the operation of the API for the electronic device 101 from the electronic device 101 through a wireless communication circuit (e.g., the communication module 510) of the wearable device 102. In some embodiments, the data may include the parameter of the identifier of the card information and the parameter of the type of the secure module.

In operation 1705, the wearable device 102 may receive data of a plurality of payment cards from the electronic device 101. For example, the processor of the wearable device 102 may receive the data of the plurality of the payment cards from the electronic device 101 through the wireless communication circuit. The data of the plurality of the cards may indicate data for issuing the plurality of the cards to the wearable device 102. In addition, the data of the plurality of the cards may indicate card information of the plurality of the cards.

In operation 1707, the wearable device 102 may store the data of the plurality of the payment cards in the secure module. For example, a memory (e.g., the memory 520) of the wearable device 102 may store the data of the plurality of the payment cards received from the electronic device 101 in a secure module (e.g., the secure module 723). In some embodiments, the memory of the wearable device 102 may store an API which permits access to the secure module. For example, the API for permitting the access to the secure module may be the OMA.

In operation 1709, the wearable device 102 may display a UI for a list of the plurality of the cards. For example, the processor of the wearable device 102 may control to display the UI for the list of the plurality of the cards on a display (e.g., the display 530). For example, the list of the plurality of the cards may include the card corresponding to the parameter of the identifier of the card information and the parameter of the type of the secure module.

In operation 1711, the wearable device 102 may receive a user input for selecting one of the plurality of the cards. For example, the processor of the wearable device 102 may receive the user input for selecting one in the list of the plurality of the cards. Receiving the user input may indicate that the user determines a default card or a card for the payment among the plurality of the cards.

In operation 1713, the wearable device 102 may transmit data based on the selected card. For example, the processor of the wearable device 102 may control to transmit the data generated based on the selected card through the communication module of the wearable device 102. The data may indicate data of the card service relating to the selected card. For example, the data may indicate information of the card payment.

Figure 18:
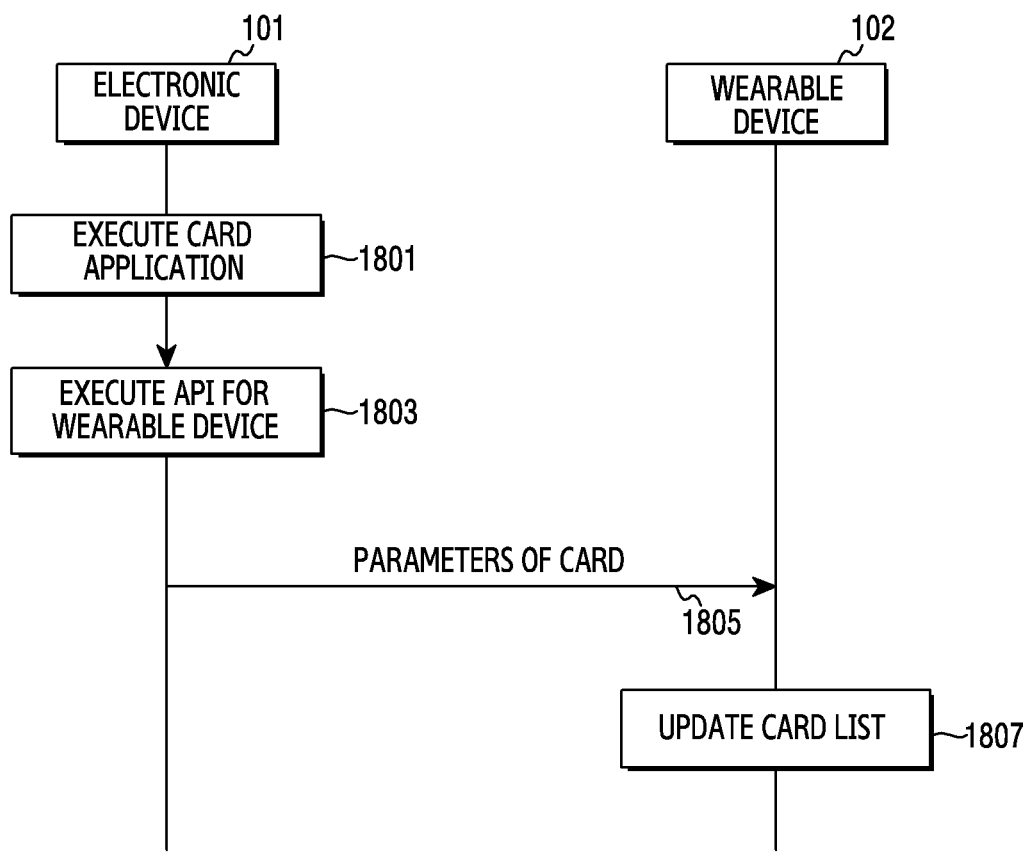
FIG. 18 illustrates signal exchanges for managing a card list of a wearable device based on an API for the wearable device according to various embodiments of the present disclosure.

FIG. 18 illustrates signal exchanges for managing a card list of a wearable device 102 based on an API for the wearable device 102 according to various embodiments of the present disclosure. FIG. 18 illustrates the signal exchanges between an electronic device 101 and the wearable device 102.

Referring to FIG. 18, in operation 1801, a processor (e.g., the processor 440) of the electronic device 101 may execute a card application. Herein, the card application may indicate an application for providing the card service.

In operation 1803, the processor of the electronic device 101 may execute the API for the wearable device 102. Herein, the API for the wearable device 102 may be included in the card application by the card service provider. In addition, the API for the wearable device 102 may indicate the function for transmitting parameters of meta data relating to the card. For example, the electronic device 101 may call the API for the wearable device 102, and thus apply the function for transmitting the parameters of the meta data relating to the card.

In operation 1805, the processor of the electronic device 101 may control to transmit the parameters of the meta data of the card to the wearable device 102 through a communication module (e.g., the communication module 410) of the electronic device 101. For example, the processor of the electronic device 101 may control to transmit the parameters of the meta data of the card to the wearable device 102 through the communication module by calling the API for the wearable device 102. Herein, the parameters of the meta data of the card may include the parameter of the identifier of the card information and the parameter of the type of the secure module. According to one embodiment, the parameters of the meta data of the card may be transmitted if the card information is stored in a secure module (e.g., the secure module 713) of the electronic device 101.

In operation 1807, a processor (e.g., the processor 540) of the wearable device 102 may update a card list of the wearable device 102 based on the parameters of the meta data of the card. That is, the processor of the wearable device 102 may identify through the parameter of the identifier of the card information and the parameter of the type of the secure module that the card information is stored in the secure module of the wearable device 102, and add a card corresponding to the card information into the card list of the wearable device 102.

Figure 19:
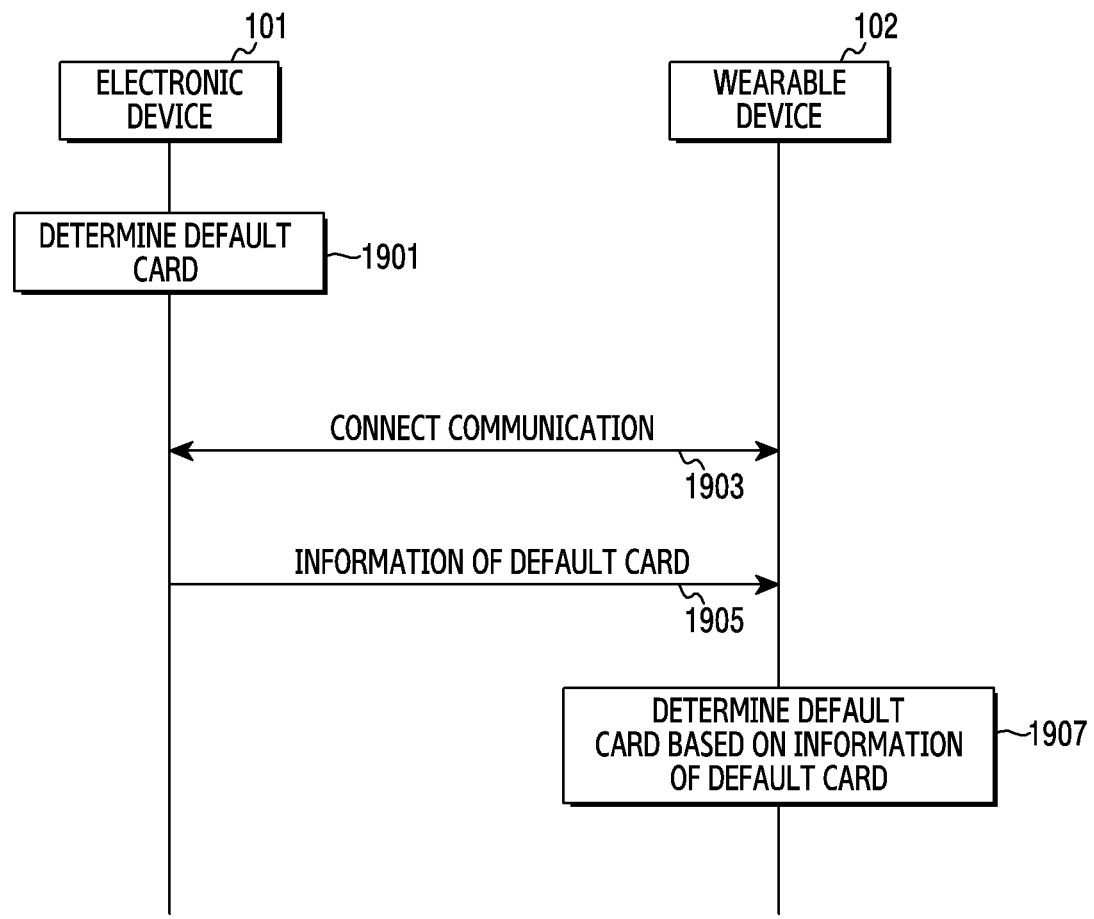
FIG. 19 illustrates signal exchanges for synchronizing a default card according to various embodiments of the present disclosure.

FIG. 19 illustrates signal exchanges for synchronizing a default card according to various embodiments of the present disclosure. FIG. 19 illustrates the signal exchanges between an electronic device 101 and a wearable device 102.

Referring to FIG. 19, in operation 1901, a processor (e.g., the processor 440) of the electronic device 101 may determine a default card of the electronic device 101 managed at the electronic device 101. The default card of the electronic device 101 managed at the electronic device 101 may be determined by a user input to a UI for a card list of the electronic device 101 displayed on the electronic device 101. In some embodiments, the default card of the electronic device 101 managed at the electronic device 101 may be determined based on user's card use details. For example, it may be determined based on the number of user card uses. As another example, a card used by the user most recently may be determined as the default card of the electronic device 101 managed at the electronic device 101. As yet another example, a card with which the user pays the greatest amount may be determined as the default card of the electronic device 101 managed at the electronic device 101.

In operation 1903, the processor of the electronic device 101 may control to perform communication connection with the wearable device 102 through a communication module (e.g., the communication module 410). For example, the processor of the electronic device 101 may control to perform the connection with the wearable device 102 through the communication module using at least one of Wi-Fi, Bluetooth, or NFC protocol. In some embodiments, the communication connection may indicate reconnection after an initial access or a previous communication connection is disconnected between the electronic device 101 and the wearable device 102.

In operation 1905, the processor of the electronic device 101 may control to transmit information of the default card of the electronic device 101 managed at the electronic device 101 to the wearable device 102 through the communication module of the electronic device 101. For example, the processor of the electronic device 101 may control to transmit information indicating which card of the electronic device 101 is determined as the default card of the electronic device 101 managed at the electronic device 101 to the wearable device 102 through the communication module of the electronic device 101.

In operation 1907, a processor (e.g., the processor 540) of the wearable device 102 may determine a default card of the wearable device 102 managed at the wearable device 102 based on the default card information of the electronic device 101 managed at the electronic device 101. That is, the processor of the wearable device 102 may determine the same card as the default card of the electronic device 101 managed at the electronic device 101 as the default card of the wearable device 102 managed at the wearable device 102. The card determined as the default card of the wearable device 102 managed at the wearable device 102 may be one of a plurality of cards issued to the wearable device 102. Hence, synchronization may be conducted between default card of the wearable device 102 managed at the wearable device 102 and the default card of the electronic device 101 managed at the electronic device 101.

In some embodiments, while a card corresponding to the default card of the electronic device 101 managed at the electronic device 101 is not issued to the wearable device 102, the processor of the wearable device 102 may receive information of the default card of the electronic device 101 managed at the electronic device 101 from the electronic device 101 through a communication module (e.g., the communication module 510) of the wearable device 102. According to one embodiment, the processor of the wearable device 102 may request the server 106 to issues the card corresponding to the default card of the electronic device 101 managed at the electronic device 101 via the electronic device 101. Next, if the card corresponding to the default card of the electronic device 101 managed at the electronic device 101 is issued to the wearable device 102, the synchronization may be performed between default card of the wearable device 102 managed at the wearable device 102 and the default card of the electronic device 101 managed at the electronic device 101.

FIG. 19 illustrates the embodiment for the synchronization between default card of the wearable device 102 managed at the wearable device 102 and the default card of the electronic device 101 managed at the electronic device 101, according to one embodiment. The synchronization described in FIG. 19 is distinguished from the synchronization between the card list 1415 of the wearable device 102 managed at the wearable device 102 and the card list 1411 of the electronic device 101 managed at the electronic device 101 of FIG. 14.

Figure 20:
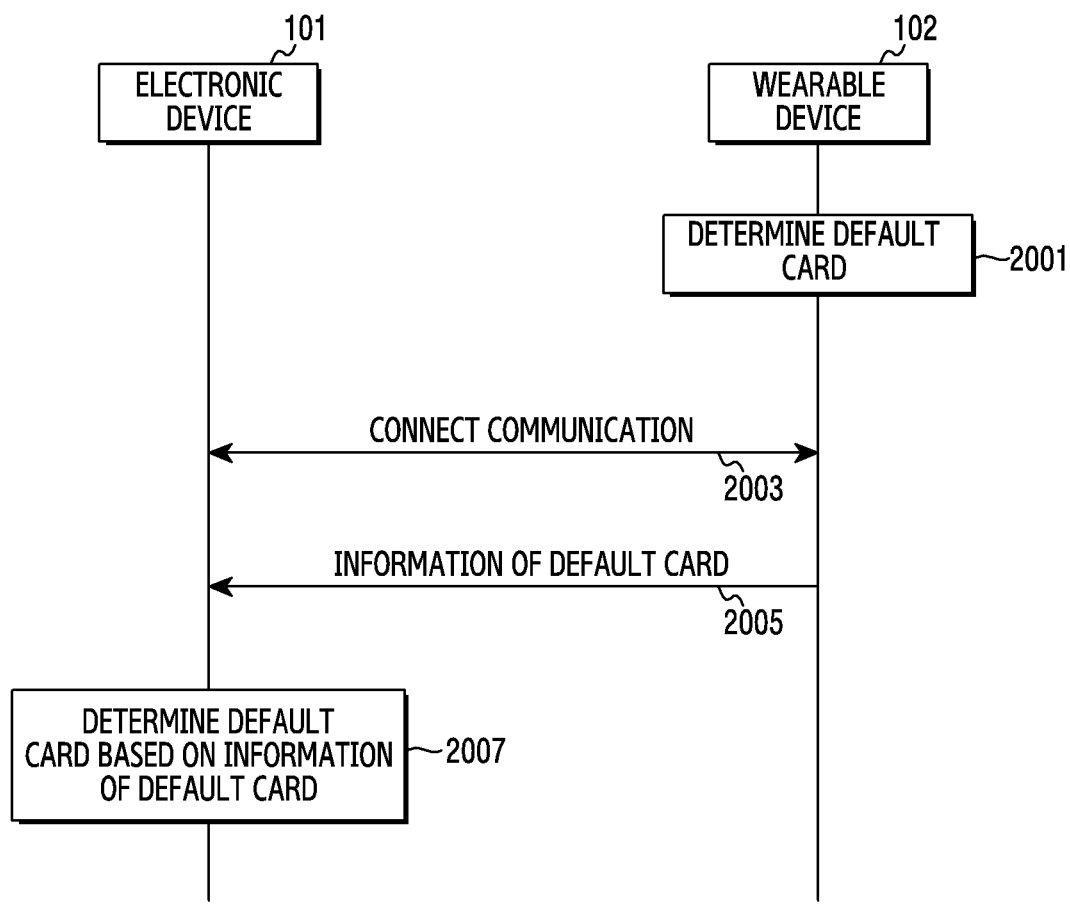
FIG. 20 illustrates signal exchanges for synchronizing a default card according to various embodiments of the present disclosure.

FIG. 20 illustrates signal exchanges for synchronizing a default card according to various embodiments of the present disclosure. FIG. 20 illustrates the signal exchanges between an electronic device 101 and a wearable device 102.

Referring to FIG. 20, in operation 2001, a processor (e.g., the processor 540) of the wearable device 102 may determine the default card of the wearable device 102 managed at the wearable device 102. The default card of the wearable device 102 managed at the wearable device 102 may be determined by a user input to a UI for a card list of the wearable device 102 displayed on the wearable device 102. In some embodiments, the default card of the wearable device 102 managed at the wearable device 102 may be determined based on the number of user card uses.

In operation 2003, the processor of the wearable device 102 may control to perform communication connection with the electronic device 101 through a communication module (e.g., the communication module 510). For example, the processor of the wearable device 102 may control to perform the connection with the electronic device 101 through the communication module of the wearable device 102 using at least one of Wi-Fi, Bluetooth, or NFC protocol. In some embodiments, the communication connection may indicate reconnection after an initial access or a previous communication connection is disconnected between the electronic device 101 and the wearable device 102.

In operation 2005, the processor of the wearable device 102 may control to transmit information of the default card of the wearable device 102 managed at the wearable device 102 to the electronic device 101 through the communication module of the wearable device 102. For example, the information of the default card of the wearable device 102 managed at the wearable device 102 may include information indicating which card of the wearable device 102 is determined as the default card of the wearable device 102 managed at the wearable device 102.

In operation 2007, a processor (e.g., the processor 410) of the electronic device 101 may determine a default card of the electronic device 101 managed at the electronic device 101 based on the default card information of the wearable device 102 managed at the wearable device 102 received from the wearable device 102. That is, the electronic device 101 may determine the same card as the default card of the wearable device 102 managed at the wearable device 102 as the default card of the electronic device 101 managed at the electronic device 101. The card determined as the default card of the electronic device 101 managed at the electronic device 101 may be one of a plurality of cards issued to the electronic device 101. Hence, synchronization may be conducted between the default card of the wearable device 102 managed at the wearable device 102 and the default card of the electronic device 101 managed at the electronic device 101.

In some embodiments, while a card corresponding to the default card of the wearable device 102 managed at the wearable device 102 is not issued to the electronic device 101, if the processor of the electronic device 101 may receive information of the default card of the wearable device 102 managed at the wearable device 102 from the wearable device 102 through a communication module (e.g., the communication module 410) of the electronic device 101, the processor of the electronic device 101 may request the server 106 to issue the card corresponding to the default card of the wearable device 102 managed at the wearable device 102. Next, if the card corresponding to the default card of the wearable device 102 managed at the wearable device 102 is issued to the electronic device 101, the synchronization may be conducted between the default card of the wearable device 102 managed at the wearable device 102 and the default card of the electronic device 101 managed at the electronic device 101.

FIG. 20 illustrates the embodiment for the synchronization between the default card of the wearable device 102 managed at the wearable device 102 and the default card of the electronic device 101 managed at the electronic device 101, according to one embodiment. The synchronization described in FIG. 20 is distinguished from the synchronization between the card list 1415 of the wearable device 102 managed at the wearable device 102 and the card list 1411 of the wearable device 102 managed at the electronic device 101 of FIG. 14.

Figure 21:
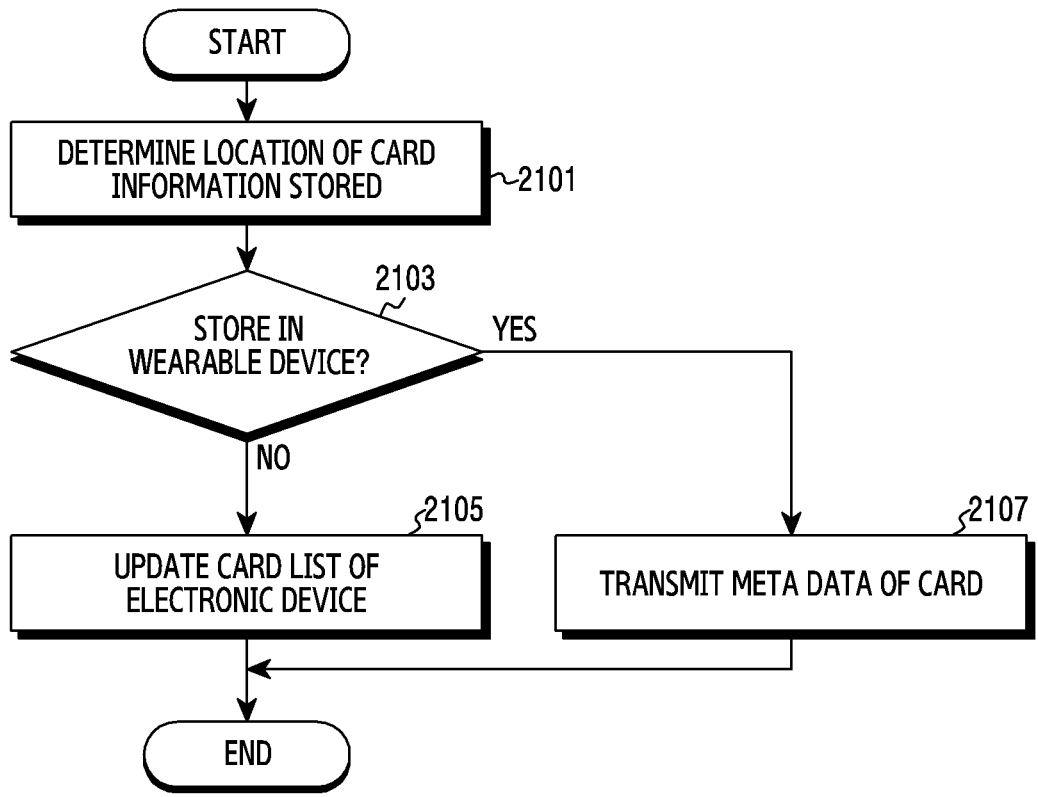
FIG. 21 illustrates a flowchart of an electronic device for determining whether to transmit meta data according to a location of a card issued according to various embodiments of the present disclosure.

FIG. 21 illustrates a flowchart of an electronic device 101 for determining whether to transmit meta data according to a location of a card issued according to various embodiments of the present disclosure. FIG. 21 illustrates an operating method of the electronic device 101.

Referring to FIG. 21, in operation 2101, a processor (e.g., the processor 440) of the electronic device 101 may determine a location of card information stored. That is, the processor of the electronic device 101 may determine whether the card is issued to the wearable device 102 or the card is issued to the electronic device 101.

In operation 2103, the processor of the electronic device 101 may identify whether card information is stored in the wearable device 102. This may be to determine only the card issued to the wearable device 102 as a default card in the wearable device 102. This is because, if the card is not issued to the wearable device 102, although the unissued card is included in the card list of the wearable device 102 and determined as the default card, the card service using the default card may not be provided.

If the card information is not stored in the wearable device 102, in operation 2105, the processor of the electronic device 101 may update the card list of the electronic device 101. That is, the processor of the electronic device 101 may add the card issued to the electronic device 101 into the card list of the electronic device 101. This is because the issued card is determined as the default card in the electronic device 101, to thus provide the card service.

By contrast, if the card information is stored in the wearable device 102, in operation 2107, the processor of the electronic device 101 may control to transmit meta data of the card to the wearable device 102 through a communication module (e.g., the communication module 410) of the electronic device 101. This may be because the card issued to the wearable device 102 is determined as the default card in the wearable device 102, to thus provide the card service. Herein, the meta data of the card may indicate meta data of the card information identifier and meta data of the secure module type.

Figure 22:
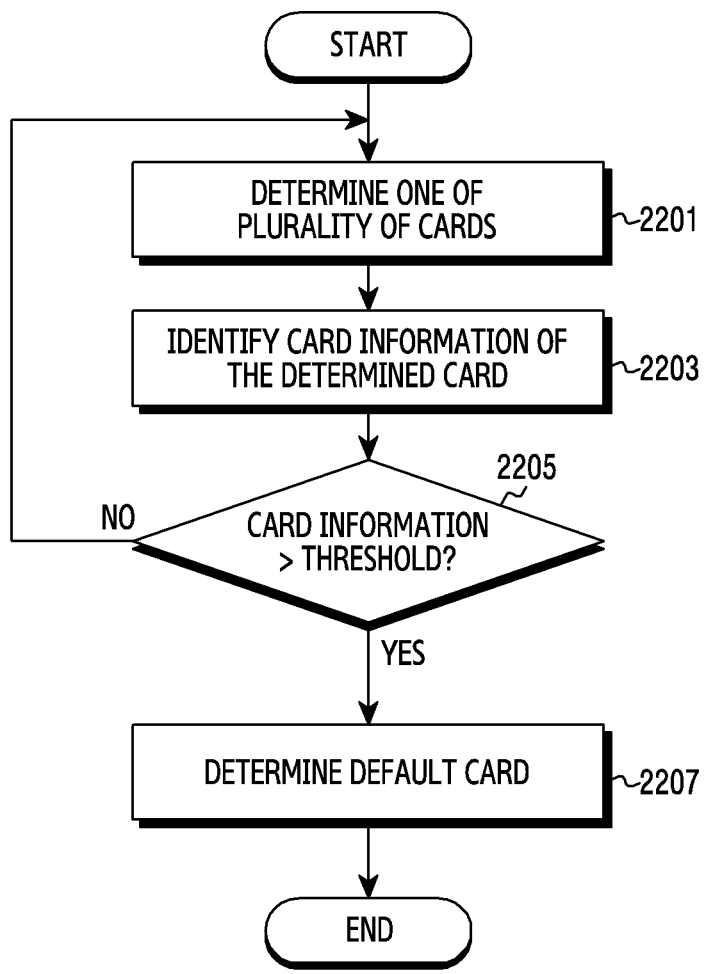
FIG. 22 illustrates a flowchart of a wearable device for setting a default card according to card information according to various embodiments of the present disclosure.

FIG. 22 illustrates a flowchart of a wearable device 102 for setting a default card according to card related information according to various embodiments of the present disclosure. FIG. 22 illustrates an operating method of the wearable device 102.

Referring to FIG. 22, in operation 2201, a processor (e.g., the processor 540) of the wearable device 102 may determine one of a plurality of cards stored in a secure module (e.g., the secure module 723). For example, the processor of the wearable device 102 may determine one of the plurality of the cards based on an issue date of the card or a card name. That is, the processor of the wearable device 102 may determine one of the plurality of the cards according to order of the card issue date or alphabetical order of the card name.

In operation 2203, the processor of the wearable device 102 may identify card information of the determined card. For example, a memory (e.g., the memory 520) of the wearable device 102 may store the number of card uses or card mileage points of the user. As another example, the processor of the wearable device 102 may identify the number of the card uses or the card mileage points through an external electronic device (e.g., the server 106 of FIG. 1).

In operation 2205, the processor of the wearable device 102 may determine whether the card information (e.g., the number of the card uses or the card mileage points) is greater than a threshold. If the card information is not greater than the threshold, the wearable device 102 may proceed to operation 2201. That is, if the card information of the determined card is not greater than the threshold, the processor of the wearable device 102 may determine other card in the plurality of the cards in operation 2201.

By contrast, if the card information is greater than the threshold, the processor of the wearable device 102 may determine the determined card as a default card. For example, if the user uses the determined card over the threshold, the processor of the wearable device 102 may determine the determined card as the default card. For another example, if the card mileage points for the determined card are greater than the threshold, the processor of the wearable device 102 may determine the determined card as the default card.

An operating method of an electronic device according to various embodiments of the present disclosure may include wirelessly pairing with an external electronic device, receiving meta data of a card from the external electronic device, receiving data relating to a plurality of payment cards from the external electronic device, storing the data in a hardware secure element of the electronic device without installing other application program relating to the data, displaying a user interface for listing the plurality of the payment cards accessed using the meta data through a first API which permits access to the hardware secure element on a touchscreen display of the electronic device, receiving a user input which selects one of the plurality of the payment cards through the touchscreen display, and transmitting data based on the selected payment card.

The external electronic device according to various embodiments of the present disclosure may include a second OS different from a first OS which includes a user interface for a payment application of the electronic device. The operating method of the electronic device according to various embodiments of the present disclosure may further include transmitting information of the selected payment card to the external electronic device. The information of the selected payment card may be used to determine the same payment card of the electronic device managed at the external electronic device as the selected payment card.

The operating method of the electronic device according to various embodiments of the present disclosure may further include transmitting information of the selected payment card to the external electronic device. The information of the selected payment card may be used to determine the same payment card of the external electronic device managed at the external electronic device as the selected payment card. The first API according to various embodiments of the present disclosure may include an OMA.

An operating method of an electronic device according to various embodiments of the present disclosure may include wirelessly pairing with an external electronic device, receiving first data generated from an operation of a first API for the external electronic device from the external electronic device, the first data indicating a location of the hardware secure element of the electronic device, receiving second data relating to a plurality of payment cards from the external electronic device, storing the second data in the hardware secure element without installing other application program relating to the second data, displaying the user interface for listing the plurality of the payment cards accessed using the first data through the first API which permits access to the hardware secure element on a touchscreen display of the electronic device, receiving a user input which selects one of the plurality of the payment cards through the touchscreen display, and transmitting data based on the selected payment card.

The external electronic device according to various embodiments of the present disclosure may include a second OS different from a first OS which includes a user interface for a payment application of the electronic device. The operating method of the electronic device according to various embodiments of the present disclosure may further include transmitting information of the selected payment card to the external electronic device. The information of the selected payment card may be used to determine the same payment card of the electronic device managed at the external electronic device as the selected payment card.

The operating method of the electronic device according to various embodiments of the present disclosure may further include transmitting information of the selected payment card to the external electronic device. The information of the selected payment card may be used to determine the same payment card of the external electronic device managed at the external electronic device as the selected payment card. The first API according to various embodiments of the present disclosure may include an OMA.

The embodiments of the present disclosure disclosed in the specification and the drawings merely present specific examples to easily explain technical details according to the embodiments of the present disclosure and to ease the understanding of the embodiments of the present disclosure, and do not limit the scope of the embodiments of the present disclosure. Thus, the scope of the various embodiments of the present disclosure should be construed that any change or modification derived based on the technical idea of the various embodiments of the present disclosure as well the disclosed embodiments are included in the scope of the various embodiments of the present disclosure.

The invention claimed is:

1. An electronic device comprising:
a housing;
a touchscreen display exposed through a first portion of the housing;
at least one connecting member coupled to a second portion of the housing, the at least one connecting member surrounding a wrist of a user;
at least one near distance wireless communication circuit disposed in the housing;
a hardware secure element configured to store security information;
a processor electrically coupled with the touchscreen display, the at least one near distance wireless communication circuit, and the hardware secure element and disposed in the housing; and
a memory electrically coupled with the processor and disposed in the housing,
wherein the memory stores a first operating system (OS) comprising a user interface for a payment application, and further stores a first application programming interface (API) which permits access to the hardware secure element,
wherein the memory stores, if instructions are executed, the instructions which cause the processor to wirelessly pair with an external electronic device using the at least one near distance wireless communication circuit, receive meta data of a card from the external electronic device through the at least one near distance wireless communication circuit, receive data relating to a plurality of payment cards from the external electronic device through the at least one near distance wireless communication circuit, store the data in the hardware secure element without installing other application program relating to the data, display the user interface for listing the plurality of the payment cards accessed using the meta data through the first API on the touchscreen display, receive a user input which selects one of the plurality of the payment cards through the touchscreen display, and transmit data based on the selected payment card using the at least one near distance wireless communication circuit.

2. The device of claim 1, wherein the external electronic device comprises a second OS which is different from the first OS.

3. The device of claim 2, wherein the second OS comprises android OS.

4. The device of claim 1, wherein the at least one near distance wireless communication circuit is configured to support at least one of wireless fidelity (WiFi), Bluetooth, or near field communication (NFC) protocol.

5. The device of claim 1, wherein the first API comprises an open mobile API (OMA).

6. An electronic device comprising:
a housing;
a touchscreen display exposed through a first portion of the housing;
at least one connecting member coupled to a second portion of the housing, the at least one connecting member surrounding a wrist of a user;
at least one near distance wireless communication circuit disposed in the housing;
a hardware secure element configured to store security information;
a processor electrically coupled with the touchscreen display, the at least one near distance wireless communication circuit, and the hardware secure element and disposed in the housing; and
a memory electrically coupled with the processor and disposed in the housing,
wherein the memory stores a first operating system (OS) comprising a user interface for a payment application, and further stores a first application programming interface (API) which permits access to the hardware secure element,
wherein the memory stores, if instructions are executed, the instructions which cause the processor to wirelessly pair with an external electronic device using the at least one near distance wireless communication circuit, receive first data generated from an operation of a second API for the external electronic device from the external electronic device through the at least one near distance wireless communication circuit, the first data indicating a location of the hardware secure element, receive second data relating to a plurality of payment cards from the external electronic device through the at least one near distance wireless communication circuit, store the second data in the hardware secure element without installing other application program relating to the second data, display the user interface for listing the plurality of the payment cards accessed using the first data through the first API on the touchscreen display, receive a user input which selects one of the plurality of the payment cards through the touchscreen display, and transmit data based on the selected payment card using the at least one near distance wireless communication circuit.

7. The device of claim 6, wherein the external electronic device comprises a second OS which is different from the first OS.

8. The device of claim 7, wherein the second OS comprises android OS.

9. The device of claim 6, wherein the at least one near distance wireless communication circuit is configured to support at least one of wireless fidelity (WiFi), Bluetooth, or near field communication (NFC) protocol.

10. The device of claim 6, wherein the first API comprises an open mobile API (OMA).

11. A method of operating an electronic device, comprising:
- wirelessly pairing with an external electronic device using at least one near distance wireless communication circuit of the electronic device;
- receiving meta data of a card from the external electronic device through the at least one near distance wireless communication circuit;
- receiving data relating to a plurality of payment cards from the external electronic device through the at least one near distance wireless communication circuit;
- storing the data in a hardware secure element of the electronic device without installing other application program relating to the data;
- displaying a user interface for listing the plurality of the payment cards accessed using the meta data through a first application programming interface (API) which permits access to the hardware secure element on a touchscreen display of the electronic device;
- receiving a user input which selects one of the plurality of the payment cards through the touchscreen display; and
- transmitting data based on the selected payment card using the at least one near distance wireless communication circuit.

12. The method of claim 11, wherein the external electronic device comprises a second operating system (OS) different from a first OS which comprises a user interface for a payment application of the electronic device.

13. The method of claim 11, further comprising:
- transmitting information of the selected payment card to the external electronic device,
- wherein the information of the selected payment card is used to determine the same payment card of the electronic device managed at the external electronic device as the selected payment card.

14. The method of claim 11, further comprising:
- transmitting information of the selected payment card to the external electronic device,
- wherein the information of the selected payment card is used to determine the same payment card of the external electronic device managed at the external electronic device as the selected payment card.

15. The method of claim 11, wherein the first API comprises an open mobile API (OMA).

\* \* \* \* \*